US010592475B1

(12) United States Patent
Ghidireac et al.

(10) Patent No.: US 10,592,475 B1
(45) Date of Patent: Mar. 17, 2020

(54) CONSISTENT DATA STORAGE IN DISTRIBUTED COMPUTING SYSTEMS

(71) Applicant: Amazon Technologies, Inc., Reno, NV (US)

(72) Inventors: Bogdan Eduard Ghidireac, Iasi (RO); Peter Sirota, Seattle, WA (US); Robert Frederick Leidle, Seattle, WA (US); Mathew Alan Mills, Seattle, WA (US); George Steven McPherson, Seattle, WA (US); Xing Wu, Redmond, WA (US); Jonathan Andrew Fritz, Seattle, WA (US)

(73) Assignee: Amazon Technologies, Inc., Seattle, NV (US)

( * ) Notice: Subject to any disclaimer, the term of this patent is extended or adjusted under 35 U.S.C. 154(b) by 740 days.

(21) Appl. No.: 14/222,103

(22) Filed: Mar. 21, 2014

Related U.S. Application Data

(60) Provisional application No. 61/921,377, filed on Dec. 27, 2013.

(51) Int. Cl.
*G06F 16/182* (2019.01)
(52) U.S. Cl.
CPC ................. *G06F 16/182* (2019.01)
(58) Field of Classification Search
CPC .......................... G06F 17/30194; G06F 16/182
USPC ........................................................ 707/827
See application file for complete search history.

(56) References Cited

U.S. PATENT DOCUMENTS

| | | | |
|---|---|---|---|
| 6,931,450 B2* | 8/2005 | Howard | G06F 16/134 |
| | | | 709/229 |
| 7,716,180 B2 | 5/2010 | Vermeulen et al. | |
| 8,260,840 B1* | 9/2012 | Sirota | G06F 9/5061 |
| | | | 370/216 |

(Continued)

OTHER PUBLICATIONS

Amazon, "Amazon Elastic MapReduce—Getting Started Guide API Version Mar. 31, 2009", Jul. 2012, 36 pages printed. (Year: 2012).*

(Continued)

*Primary Examiner* — Tony Mahmoudi
*Assistant Examiner* — Michael Le
(74) *Attorney, Agent, or Firm* — Robert C. Kowert; Kowert, Hood, Munyon, Rankin & Goetzel, P.C.

(57) ABSTRACT

Methods and apparatus for providing consistent data storage in distributed computing systems. A consistent distributed computing file system (consistent DCFS) may be backed by an object storage service that only guarantees eventual consistency, and may leverage a data storage service (e.g., a database service) to store and maintain a file system/directory structure (a consistent DCFS directory) for the consistent DCFS that may be accessed by compute nodes for file/directory information relevant to the data objects in the consistent DCFS, rather than relying on the information maintained by the object storage service. The compute nodes may reference the consistent DCFS directory to, for example, store and retrieve strongly consistent metadata referencing data objects in the consistent DCFS. The compute nodes may, for example, retrieve metadata from consistent DCFS directory to determine whether the object storage service is presenting all of the data that it is supposed to have.

24 Claims, 15 Drawing Sheets

(56) References Cited

U.S. PATENT DOCUMENTS

| | | | |
|---|---|---|---|
| 8,285,925 B1* | 10/2012 | Sorenson, III | G06F 3/0605 711/113 |
| 8,296,419 B1* | 10/2012 | Khanna | G06F 9/5072 709/201 |
| 8,595,267 B2 | 11/2013 | Sivasubramanian et al. | |
| 9,348,855 B2* | 5/2016 | Shazly | G06F 16/2219 |
| 9,438,665 B1* | 9/2016 | Vasanth | H04L 67/10 |
| 2004/0167898 A1* | 8/2004 | Margolus | G06F 16/2358 |
| 2006/0116985 A1* | 6/2006 | Thind | G06F 17/30123 |
| 2009/0144388 A1* | 6/2009 | Gross | G06F 12/0813 709/213 |
| 2010/0077468 A1* | 3/2010 | Pragides | H04L 67/36 726/7 |
| 2011/0055494 A1* | 3/2011 | Roberts | G06F 3/0607 711/154 |
| 2012/0047139 A1* | 2/2012 | Fitzer | G06F 16/252 707/737 |
| 2012/0117116 A1* | 5/2012 | Jacobson | G06F 17/30657 707/792 |
| 2012/0166487 A1* | 6/2012 | Stougie | G06F 11/1076 707/792 |
| 2012/0259894 A1* | 10/2012 | Varley | G06F 16/2322 707/795 |
| 2012/0284317 A1* | 11/2012 | Dalton | G06F 17/301 707/827 |
| 2012/0331462 A1* | 12/2012 | Falko | G06F 9/45533 718/1 |
| 2013/0205028 A1* | 8/2013 | Crockett | G06F 9/5027 709/226 |

OTHER PUBLICATIONS

Amazon, "Amazon Elastic MapReduce—Developer Guide API Version Mar. 31, 2009", Jul. 2013, 483 pages printed (Year: 2013).*

DeCandia et al., "Dynamo: Amazon's Highly Available Key-Value Store", 2007, 16 pages printed (Year: 2007).*

Thant et al., "Improving the Availability of NoSQL databases for Cloud Storage", Jan. 2012, 7 pages printed. (Year: 2012).*

U.S. Appl. No. 12/334,004, filed Dec. 12, 2008, Peter Sirota.

U.S. Appl. No. 12/415,649, filed Mar. 31, 2009, James A.D. White/Daniel Davis.

"AmazonS3—Hadoop Wiki", Steve Loughran, Jan. 29, 2013, pp. 1-4.

Amazon Web Services "Amazon Elastic MapReduce; API Reference" Mar. 31, 2009, pp. 1-83.

Amazon Web Services "Amazon Elastic MapReduce; Developer Guide", Mar. 31, 2009, pp. 1-589.

* cited by examiner

CONSISTENT DATA STORAGE IN DISTRIBUTED COMPUTING SYSTEMS

This application claims benefit of priority of U.S. Provisional Application Ser. No. 61/921,377 entitled "CONSISTENT DATA STORAGE IN DISTRIBUTED COMPUTING SYSTEMS" filed Dec. 27, 2013, the content of which is incorporated by reference herein in its entirety.

BACKGROUND

Many companies and other organizations operate computer networks that interconnect numerous computing systems to support their operations, such as with the computing systems being co-located (e.g., as part of a local network) or instead located in multiple distinct geographical locations (e.g., connected via one or more private or public intermediate networks). For example, data centers housing significant numbers of interconnected computing systems have become commonplace, such as private data centers that are operated by and on behalf of a single organization, and public data centers that are operated by entities as businesses to provide computing resources to customers or clients. Some public data center operators provide network access, power, and secure installation facilities for hardware owned by various clients, while other public data center operators provide "full service" facilities that also include hardware resources made available for use by their clients. However, as the scale and scope of typical data centers has increased, the tasks of provisioning, administering, and managing the physical computing resources have become increasingly complicated.

The advent of virtualization technologies for commodity hardware has provided benefits with respect to managing large-scale computing resources for many clients with diverse needs, allowing various computing resources to be efficiently and securely shared by multiple clients. For example, virtualization technologies may allow a single physical computing machine to be shared among multiple users by providing each user with one or more virtual machines hosted by the single physical computing machine, with each such virtual machine being a software simulation acting as a distinct logical computing system that provides users with the illusion that they are the sole operators and administrators of a given hardware computing resource, while also providing application isolation and security among the various virtual machines. Furthermore, some virtualization technologies are capable of providing virtual resources that span two or more physical resources, such as a single virtual machine with multiple virtual processors that spans multiple distinct physical computing systems. As another example, virtualization technologies may allow data storage hardware to be shared among multiple users by providing each user with a virtualized data store which may be distributed across multiple data storage devices, with each such virtualized data store acting as a distinct logical data store that provides users with the illusion that they are the sole operators and administrators of the data storage resource.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION

Various embodiments of methods and apparatus for providing consistent data storage in distributed computing systems are described. As a general description of a distributed computing system as used herein, one or more compute nodes may access portions of a data set from data storage, process the data, and output the processed data to data storage (which may be, but is not necessarily, the same data storage from which the data set was accessed). The distributed computing system may be implemented according to a distributed computing framework. As a non-limiting example of a framework for implementing such distributed computing systems, the Apache™ Hadoop® open source software library provides a framework that allows for the distributed processing of large data sets across clusters of compute nodes using simple programming models.

Figure 2:
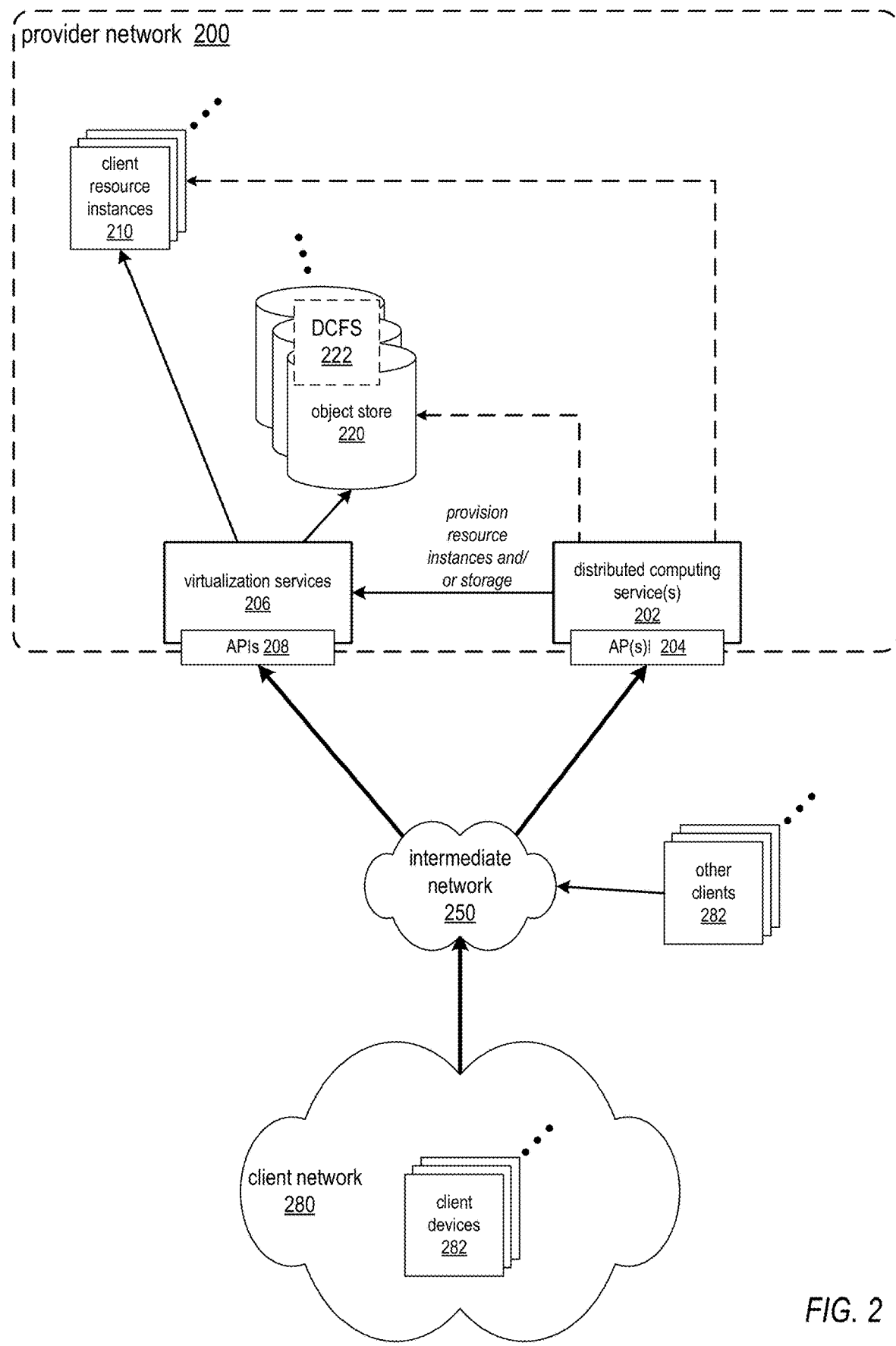
FIG. 2 illustrates an example service provider network environment in which embodiments of methods and apparatus for providing consistent data storage in distributed computing systems may be implemented.

Embodiments of a distributed computing system are generally described herein in the context of a service provider that provides to clients, via an intermediate network such as the Internet, virtualized resources (e.g., virtualized computing and storage resources) implemented on a provider network of the service provider. FIG. 2 illustrates an example service provider network environment in which embodiments of methods and apparatus for providing consistent data storage in distributed computing systems may be implemented. FIGS. 9 through 12 and the section titled Example provider network environments further illustrate and describe example environments in which embodiments of a distributed computing system may be implemented, and are not intended to be limiting.

Referring to FIG. 2, the service provider may provide one or more services (referred to as distributed computing service(s) 202) to clients via which the clients may provision, manage, and operate distributed computing systems at least partially on a provider network 200. In at least some embodiments, provisioning a distributed computing system via the distributed computing service(s) 202 may include provisioning one or more virtualized computing resources (shown as client resource instances 210) as compute nodes for the distributed computing system and provisioning virtualized storage (shown as object store 220) as data storage for data sets used in the distributed computing system (an example data set is shown as distributed computing file system (DCFS) 222). Note that client resource instances 210 and/or object store 220 may be otherwise provisioned in various embodiments. For example, as an alternative, in at least some embodiments, a client (e.g., as represented by client network 280) may provision one or more client devices 282 on an external client network as compute nodes for the distributed computing service, while provisioning the data set to be used in the distributed computing system as DCFS 222 on an object store 220 via distributed computing service(s) 202.

Note that, in at least some embodiments, client(s) may interact with distributed computing service(s) 202 via one or more application programming interfaces (API(s) 204) to request provisioning of computation and storage resources on provider network 200 for specific distributed computing systems, and distributed computing service(s) 202 may in turn interact with virtualization service(s) 206 via API(s) 208 to actually provision the computation and storage resources on provider network 200. However, in some embodiments, distributed computing service(s) 202 may directly interact with computation and storage resources on provider network to provision or otherwise configure the resources for specific distributed computing systems.

In at least some embodiments, the service provider may implement such distributed computing systems on behalf of clients according to a distributed computing framework, for example the Apache™ Hadoop® framework. Note, however, that other frameworks may be used in some embodiments.

Figure 14:
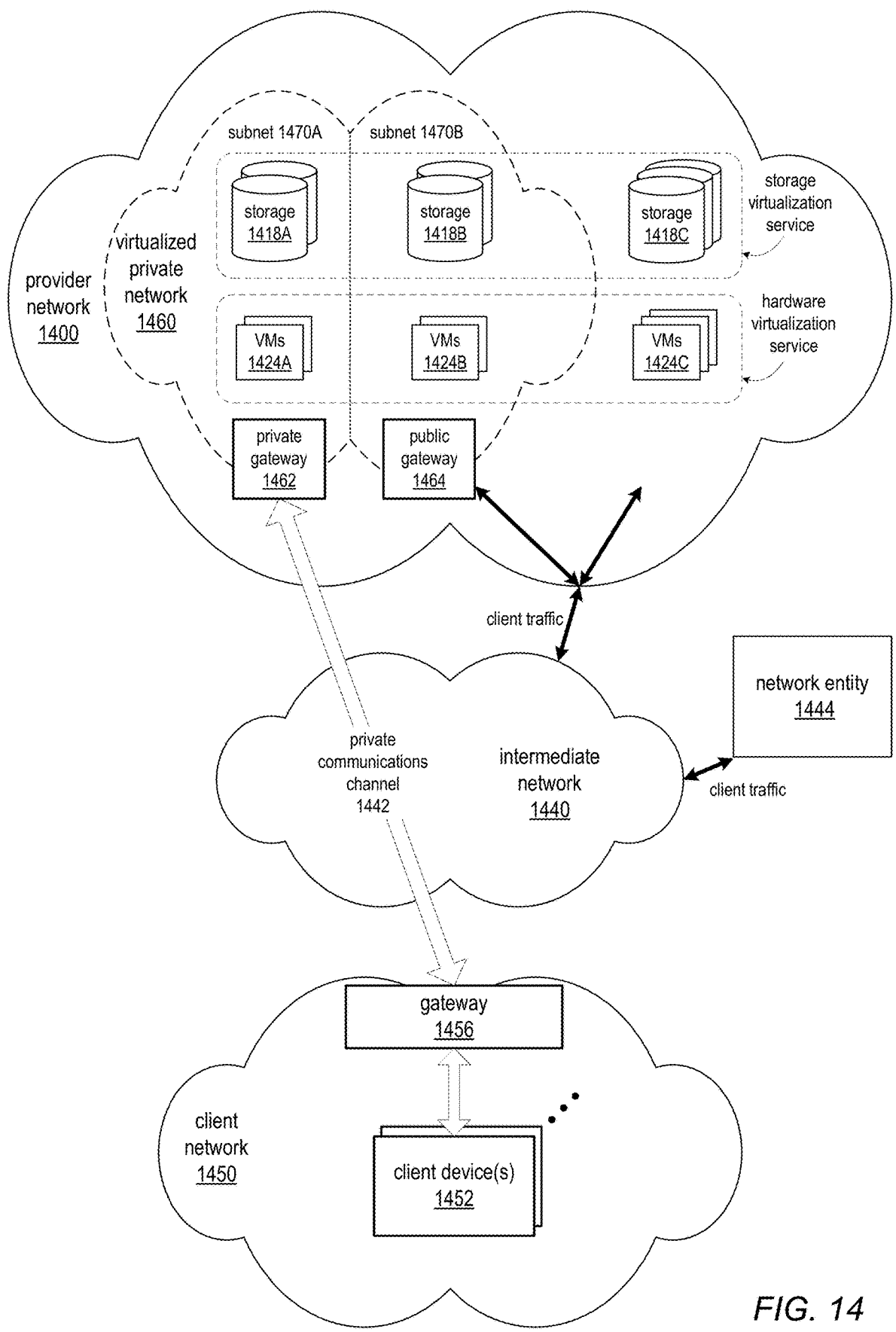
FIG. 14 illustrates an example provider network that provides virtualized private networks to at least some clients, according to at least some embodiments.

In at least some embodiments, at least some of the resources provided to clients of the service provider via the provider network 200 may be virtualized computing resources implemented on multi-tenant hardware that is shared with other client(s) and/or on hardware dedicated to the particular client. Each virtualized computing resource may be referred to as a resource instance 210. Resource instances 210 may, for example, be rented or leased to clients of the service provider. For example, clients of the service provider may access one or more services 206 of the provider network via API(s) 208 to the services 206 to obtain and configure resource instances 210 and to establish and manage virtual network configurations that include the resource instances 210, for example virtualized private networks as illustrated in FIG. 14. The resource instances 210 may, for example, be implemented according to hardware virtualization technology that enables multiple operating systems to run concurrently on a host computer, i.e. as virtual machines (VMs) on the hosts. A hypervisor, or virtual machine monitor (VMM), on a host presents the VMs on the host with a virtual platform and monitors the execution of the VMs. Each VM may be provided with one or more private IP addresses; the VMM on a host may be aware of the private IP addresses of the VMs on the host. For further information on hardware virtualization technology, see FIG. 12.

In at least some embodiments, at least some of the resources provided to clients of the service provider via the provider network 200, virtualization service(s) 206, and API(s) 208, may be virtualized storage resources implemented on storage hardware on the provider network 200 that may be shared with other client(s). Virtualized data store technology may be used in various embodiments to provide different types of data storage and storage services for clients. For example, an object storage service may provide general, unstructured data object-based storage 220 to clients via which the clients may store and retrieve arbitrary types of data objects. As shown in FIG. 2, the unstructured object store 220 provided by the object storage service may, for example, be used to store data sets for distributed computing systems provisioned through the distributed computing service(s) 202. An example data set for a distributed computing system is shown as distributed computing file system (DCFS) 222. As another example, not shown in FIG. 2, a data storage service, for example a database service provided by the service provider or by some other entity, may provide a structured data model (e.g., a database model) to the clients for storing and retrieving structured data. The section titled Data storage service example and FIG. 10 describe embodiments of an example database service that may be used in at least some embodiments.

Figure 1:
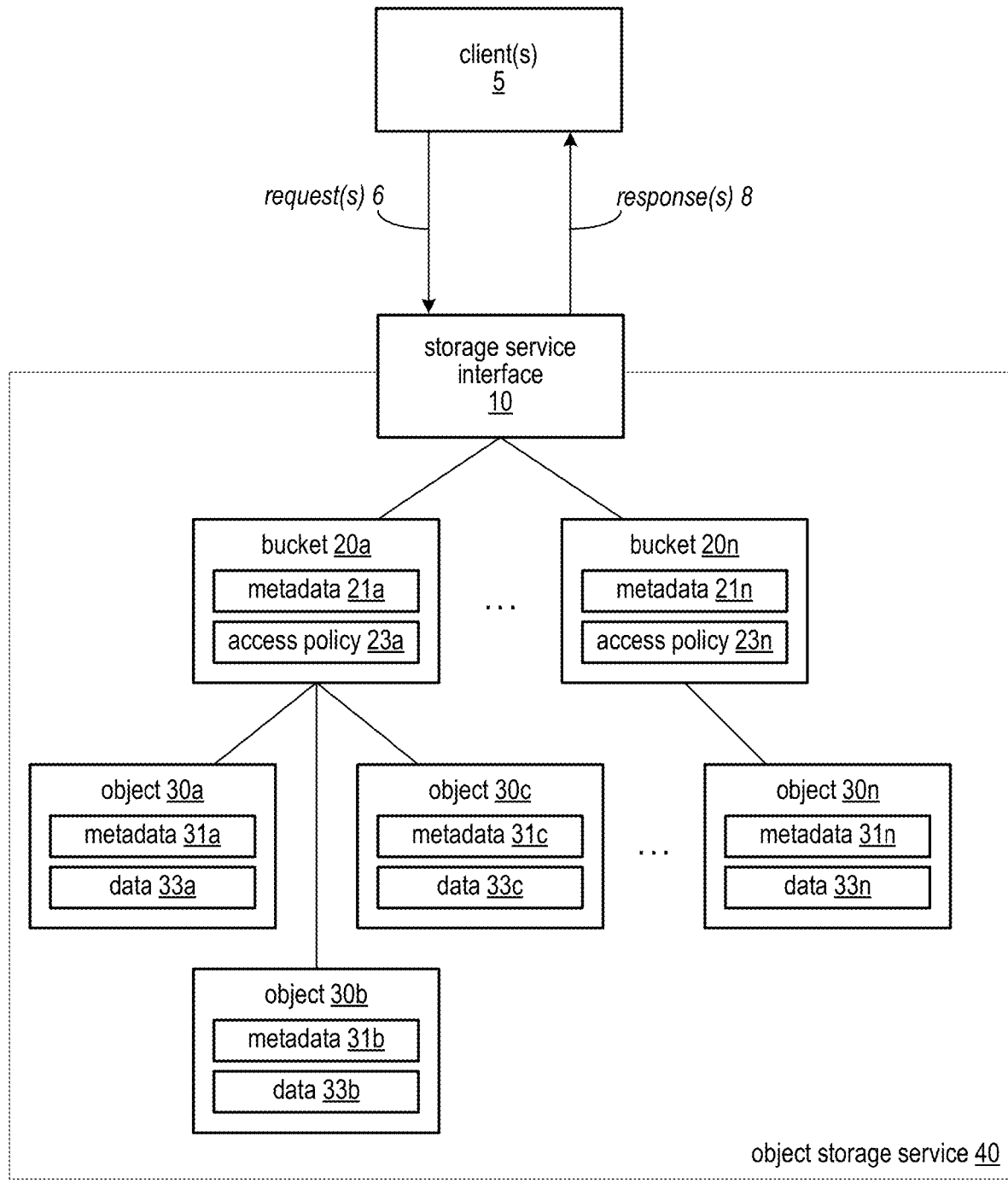
FIG. 1 illustrates an example embodiment of an unstructured object storage model for providing virtualized storage resources to clients as a service.

An example embodiment of an unstructured object storage model for providing virtualized storage resources to clients as a service, such as a web service, is illustrated in FIG. 1. In the illustrated model, storage service interface 10 is provided as a client-facing interface to object storage service 40. Storage service interface 10 may, for example, be implemented as, or alternatively may include, an application programming interface (API). According to the model presented to a client 5 by interface 10, the storage service may be organized as an arbitrary number of buckets 20a-n accessible via interface 10. Each bucket 20 may be configured to store an arbitrary number of objects 30a-n, which in turn may store data specified by a client 5 of the storage service 40. One or more clients 5 may submit requests to the storage service interface to store, retrieve, and, as described in more detail below, perform one or more operations on data object 30. Storage service interface may provide responses 8 to the requests, which may include acknowledgements and/or retrieved data, for example. Generally, in addition to storage and retrieval of data objects, the requests or commands that the storage service 40 may perform may include commands that modify data within the storage service 40. In this way, the clients 5 are not burdened with removing the data from the storage service 40, performing the operations, and then returning the modified data to the storage service. This configuration may save network bandwidth and processing resources for the clients 5, for example.

In some embodiments storage service interface 10 may be configured to support interaction between the storage service 40 and its client(s) 5 according to a web services model. For example, in one embodiment, interface 10 may be accessible by clients as a web services endpoint having a Uniform Resource Locator (URL) to which web services calls generated by service clients may be directed for processing. Generally speaking, a web service may refer to any type of computing service that is made available to a requesting client via a request interface that includes one or more Internet-based application layer data transport protocols, such as a version of the Hypertext Transport Protocol (HTTP) or another suitable protocol.

In at least some embodiments, the object storage service 40 may be configured to internally replicate data objects for data redundancy and resiliency purposes. However, after an operation is performed on a data object, it may take some period of time, generally seconds or minutes but possibly even hours or days, for the change to propagate to all instances of the data object. Thus, the object storage service 40 does not guarantee that an access of a data object stored in the storage service 40 will always return a latest or most recent version of the data object. This property of a storage service such as object storage service 40 may be referred to herein as eventual consistency, as a data object is generally guaranteed to be only eventually consistent across all instances. A storage service with this property, such as object storage service 40, may be referred to as an eventually consistent storage service, and can be said to support an eventual consistency model. In contrast, a strongly consistent storage service supports a strong consistency model, and a strongly consistent storage service may guarantee that an access of a data object stored in the storage service will return a latest or most recent version of the data object.

Figure 3:
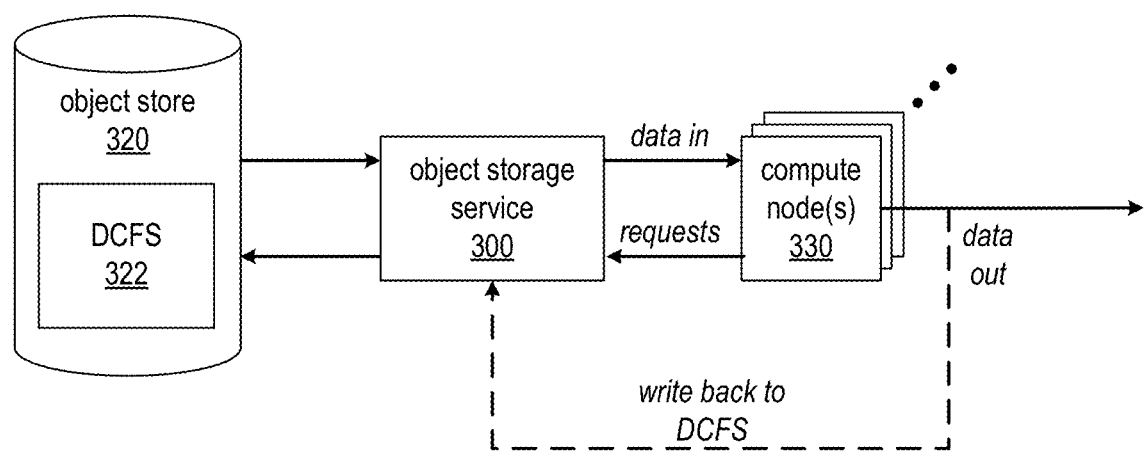
FIG. 3 illustrates an object storage service as illustrated in FIG. 1 used in a provider network environment as illustrated in FIG. 2 to provide a file system for a distributed computing system as virtualized storage on an object store.

FIG. 3 illustrates an object storage service as illustrated in FIG. 1 used in a provider network environment as illustrated in FIG. 2 to provide a file system for a distributed computing system as virtualized storage on an object store. The distributed computing system may be implemented according to a distributed computing framework. As a non-limiting example of a framework for implementing such distributed computing systems, the Apache™ Hadoop® open source software library provides a framework that allows for the distributed processing of large data sets across clusters of compute nodes using simple programming models. Note that Apache™ Hadoop® provides an implementation of MapReduce, a programming model for processing large data sets with a parallel, distributed algorithm on a cluster. A MapReduce program includes a Map( ) procedure that performs filtering and sorting and a Reduce( ) procedure that performs a summary operation.

The distributed computing system may include one or more compute nodes 320. The compute nodes 320 may be provisioned as client resource instances 210 as shown in FIG. 2, or alternatively may be provisioned as client devices 282 on a client network 280 as shown in FIG. 2. A data set for the distributed computing system may be instantiated on object store 320 as distributed computing file system (DCFS) 322. To process data from the data set, compute nodes 320 may access DCFS 322 via object storage service 300. In at least some embodiments, object storage service 300 may provide one or more one or more APIs via which the compute nodes 320 or other entities may access the object storage service 300. Processed data may be, but is not necessarily, written back to DCFS 322. In some cases, at least some of the processed data that is written back to DCFS 322 may be accessed by compute node(s) 320. For example, a job (e.g., a MapReduce job) may read data from DCFS 322 via object storage service 300 and write output data to files in an output directory of the DCFS 322. A subsequent job (e.g., another MapReduce job) may then attempt to access data from at least some files in the output directory via object storage service 300.

An unstructured object store provided via an object storage service 300 as illustrated in FIGS. 1 through 3 may have advantages including but not limited to the ability to store very large data sets, high throughput, reliability and high availability due to features such as data replication, and flexibility. A client may leverage the object storage service 300 to easily, and relatively inexpensively, provision additional storage as needed without having to install and configure additional storage devices on the client's network. However, as noted above, an object storage service as illustrated in FIGS. 1 through 3, because of features such as data replication, may have the property of eventual consistency. In other words, after an operation is performed on a data object, it may take some period of time, generally minutes but possibly even hours or days, for the change to propagate to all instances of the data object. Thus, a data set stored in object store 320 by object storage service 300 is not guaranteed to be consistent across all storage nodes at any given time. This eventual consistency property of an object store 320 as shown in FIG. 3 may cause problems in at least some distributed computing systems, for example distributed computing systems in which data objects that are read from DCFS 322, modified, and written back to DCFS 322 need to be accessed again by the compute nodes 320 in a consistent timely manner.

As another example, directory structures or files in the DCFS 322 may be modified during processing of a data set (DCFS 322); for example, one or more directory names or file names may be changes as part of the distributed computing system processing tasks performed by compute nodes 320. For example, to indicate that a file in DCFS 322 has been processed, the name of the file may be changed. As another example, the name of a directory may be changed at the end of a job to indicate status of file(s) within the directory. However, the object storage service 300 may not guarantee that the mapping of names to objects in object store 320 is strongly consistent.

Consistent Distributed Computing File System (Consistent DCFS)

Methods and apparatus for providing consistent data storage in distributed computing systems are described. The methods and apparatus for providing consistent data storage in distributed computing systems may be collectively referred to as a consistent distributed computing file system (consistent DCFS).

Figure 4:
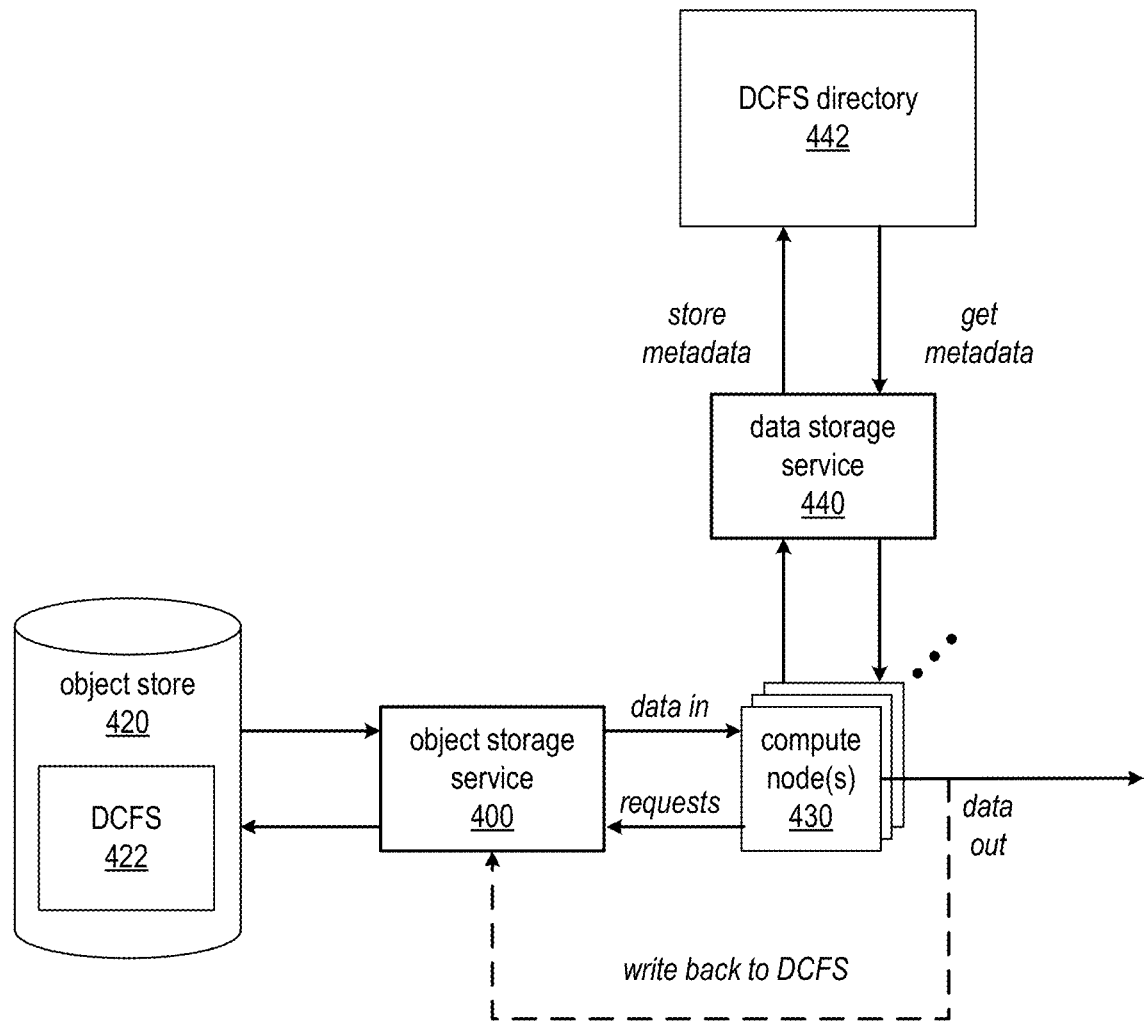
FIG. 4 illustrates a consistent distributed computing file system (DCFS) implementation in a distributed computing system, according to at least some embodiments.

FIG. 4 illustrates a consistent DCFS implementation in a distributed computing system implementation, according to at least some embodiments. The distributed computing system may be implemented according to a distributed computing framework. As a non-limiting example of a framework for implementing such distributed computing systems, the Apache™ Hadoop® open source software library provides a framework that allows for the distributed processing of large data sets across clusters of compute nodes using simple programming models. Note that Apache™ Hadoop® provides an implementation of MapReduce, a programming model for processing large data sets with a parallel, distributed algorithm on a cluster. A MapReduce program includes a Map( ) procedure that performs filtering and sorting and a Reduce( ) procedure that performs a summary operation.

In embodiments of a consistent DCFS, a DCFS 422 may be backed by an object store 420 and object storage service 400. However, to maintain the advantages of the object store and object storage service as illustrated in FIGS. 1 through 3 while overcoming the problems that may be caused by the fact that the object store and object storage service only provide eventual consistency, the distributed computing system may leverage a data storage service 440, for example a multi-tenant database service provided by the service provider to multiple clients (tenants) via one or more APIs, to store a file system/directory structure (referred to herein as a DCFS directory 442) for the DCFS 422 that may be accessed by the compute nodes 430 of the distributed computing system implementation for file/directory information relevant to the data objects in the DCFS 422, rather than relying on the information maintained by the object storage service 400. The compute nodes 430 may reference the DCFS directory 442 to, for example, store, update, and/or retrieve strongly consistent metadata referencing data objects (files, directories, etc.) in the DCFS 422. The compute nodes 430 may, for example, retrieve metadata from DCFS directory 442 to determine whether object storage service 400 is presenting all of the data that it is supposed to have. The metadata may be maintained in the DCFS directory 442 by the data storage service 440 as key-value stores, in relational tables, or according to other data schemas, structures or formats or combinations thereof. The section titled Data storage service example and FIG. 10 describe embodiments of an example database service that may be used as data storage service 440 in at least some embodiments. In at least some embodiments, object storage service 400 and data storage service 440 may each provide one or more APIs via which the compute nodes 430 may access the respective services.

Figure 5:
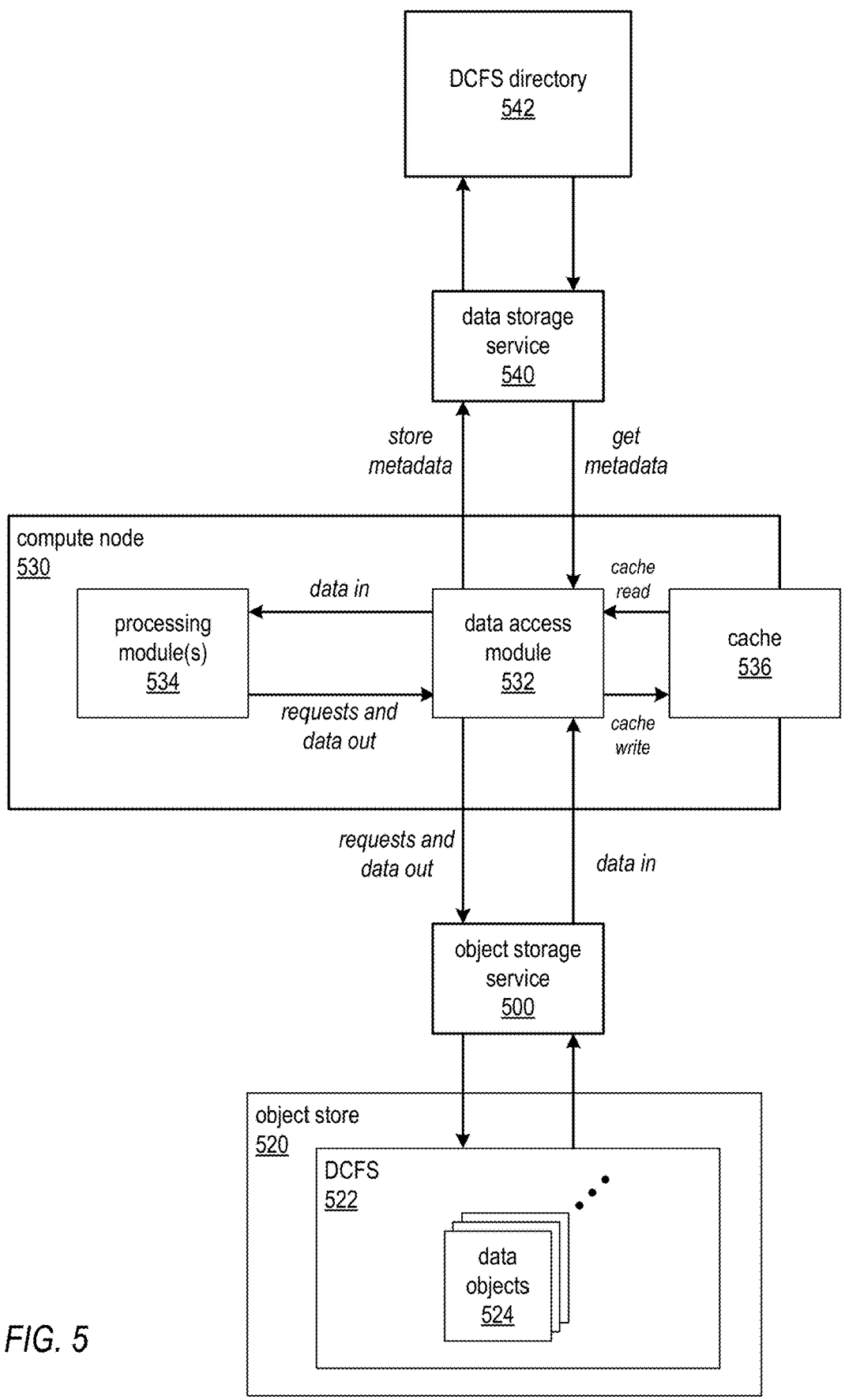
FIG. 5 illustrates a compute node in a distributed computing system implementation, according to at least some embodiments.

FIG. 5 illustrates a compute node in a distributed computing system implementation, according to at least some embodiments. In at least some embodiments, a compute node 530 may include one or more processing modules 534 that may implement processing portions of the distributed computing system, for example MapReduce procedures or jobs according to the distributed computing framework (e.g., Apache™ Hadoop®). Compute node 530 may also include one or more data access modules 532 that access DCFS directory 542 via data storage service 540 to obtain metadata for the DCFS 522, and that may access data objects 524 in DCFS 522 on object store 520 via object storage service 500 according to the metadata maintained in DCFS directory 542 and on behalf of processing module(s) 534. In at least some embodiments, object storage service 500 and data storage service 440 may each provide one or more APIs via which data access module(s) 532 on compute node 530 may access the respective services.

In at least some embodiments, data access module(s) 532 may be implemented as one or more libraries that implement functionalities of consistent DCFS as described herein and that may be accessed by other processes (e.g., processing module 534 processes) on the compute node 530 to perform the consistent DCFS functionalities.

In at least some embodiments, a compute node 530 may also include a local cache 536 (e.g., a write-through cache) for data. In these embodiments, previously retrieved data objects 524 may be stored to cache 536, and data access module(s) 532 may check cache 536 for data object(s) 524 before accessing DCFS 522. Note that, in some embodiments, cache 536 may at least in part be implemented externally to compute node 530, for example as a cache maintained for multiple compute nodes 530 on a server device or devices local to the compute nodes 530, or on another compute node or nodes 530. In some embodiments, instead of or in addition to caching data object(s) 524 from DCFS 522 on or at compute node(s) 530, metadata from DCFS directory 542 may also be cached.

While compute node 530 may generally be one of multiple compute nodes in a distributed computing system, for example a compute node in a cluster of compute nodes of a distributed computing system implemented according to distributed computing framework such as the Apache™ Hadoop® framework, in some implementations compute node 530 may be a single node that is configured to access data objects 524 from DCFS 522 according to consistent metadata stored in DCFS directory 542.

Figure 6:
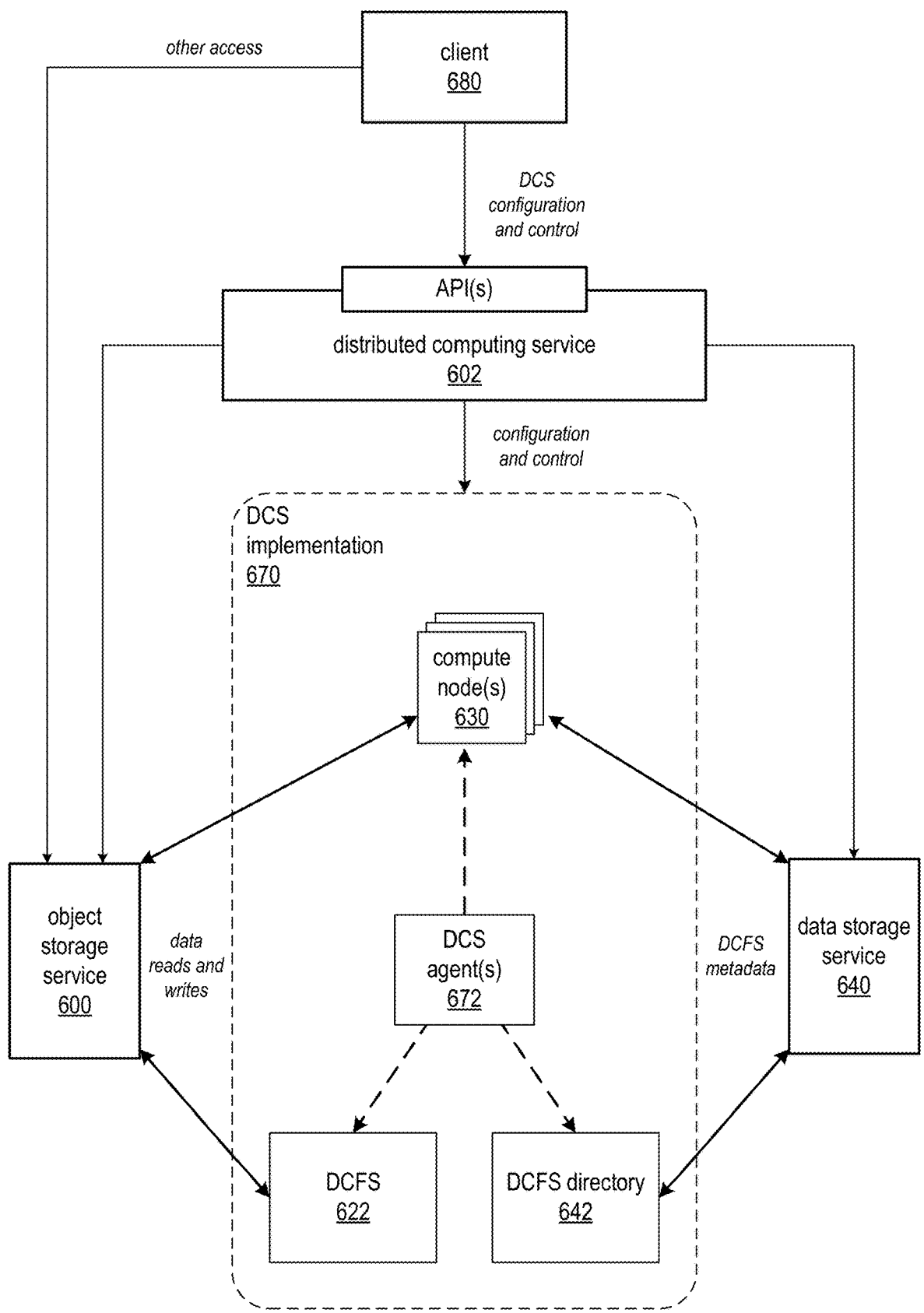
FIG. 6 illustrates an example logical architecture of a distributed computing service (DCS) implementation, according to at least some embodiments.

FIG. 6 illustrates an example logical architecture of a distributed computing service (DCS) implementation 670, according to at least some embodiments. In at least some embodiments, a client 680 may configure and control a DCS implementation 670 via one or more distributed computing services 602. DCS implementation 670 may include one or more compute nodes 630, for example compute nodes as illustrated in FIG. 5. DCS implementation 670 may also include a consistent distributed computing file system (DCFS) provisioned and accessed via an object storage service 600. DCS implementation 670 may also include a DCFS directory 642 provisioned and accessed via a data storage service 640.

In at least some embodiments, a DCS implementation 670 may also include one or more DCS agents 672 that may, for example, be implemented on one or more of client 680's resource instances on the provider network or on one or more devices on the client's external network (see, e.g., FIG. 2). The agents 672 may be configured to perform one or more background tasks (e.g., maintenance or health tasks) for the DCS implementation. As just one example of an agent 672, in some implementations, a client 680 process or user may access data objects in buckets on the object store (see, e.g., FIG. 1) via the object storage service 600. This access may occasionally result in changes to the data objects and thus changes to the metadata maintained by the objects storage service 600 for the data objects, for example moving or renaming of data objects. These changes may result in inconsistencies between the metadata maintained by the object storage service 600 and the metadata maintained by the data storage service 640 in DCFS directory 642. Thus, an agent 672 may be configured as a background task that periodically, aperiodically, or substantially continuously checks the metadata maintained in the two systems and, upon discovering inconsistencies, resolves the inconsistencies, for example by correcting or updating one or more entries in DCFS directory 642.

In at least some embodiments, distributed computing service 602, via API(s), may provide one or more commands that allow client 680 to initiate one or more maintenance or control tasks in DCS implementation 670. As just one example, distributed computing service 602 may provide one or more commands via API(s) that allow client 680 to initiate a consistency check for the metadata maintained by DCFS directory 642 against the metadata maintained by the object storage service 600. This, for example, may allow the client 680 to force an update of the DCFS directory 642 after making changes to DCFS 622 via object storage service 600.

While there may generally be multiple compute nodes 630 in a DCS implementation 670, in some implementations there may be a single compute node 630 that is configured to access DCFS 622 according to consistent metadata stored in DCFS directory 642.

Figure 7:
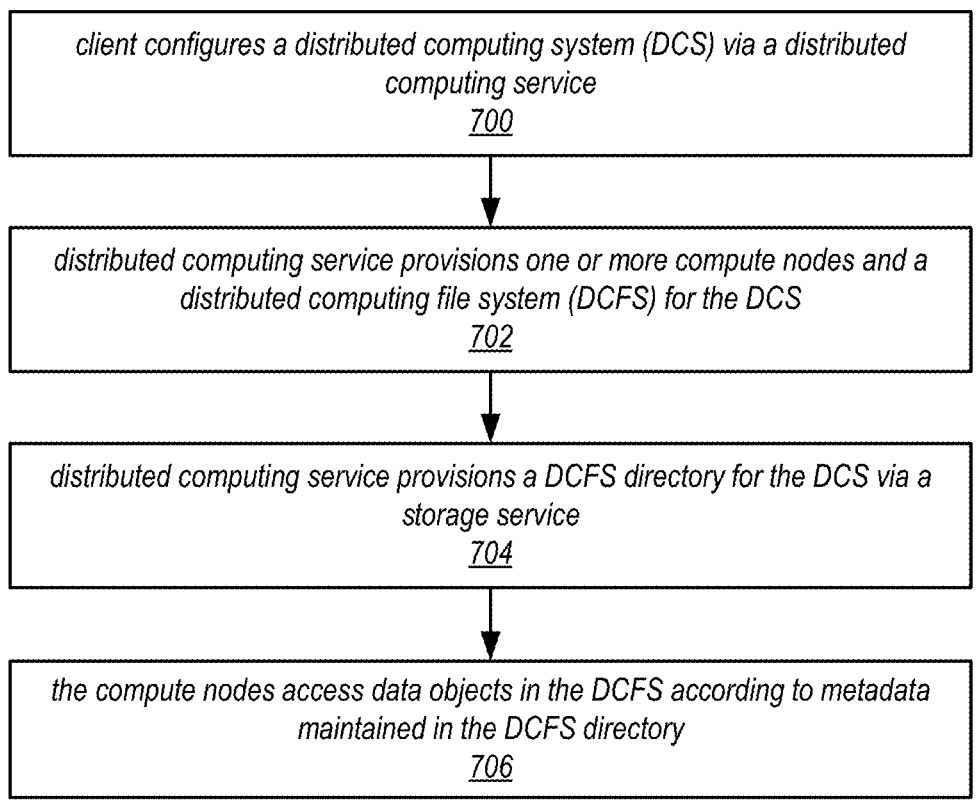
FIG. 7 is a high-level flowchart of a method for establishing a consistent distributed computing file system (DCFS) for a distributed computing system (DCS), according to at least some embodiments.
Figure 10:
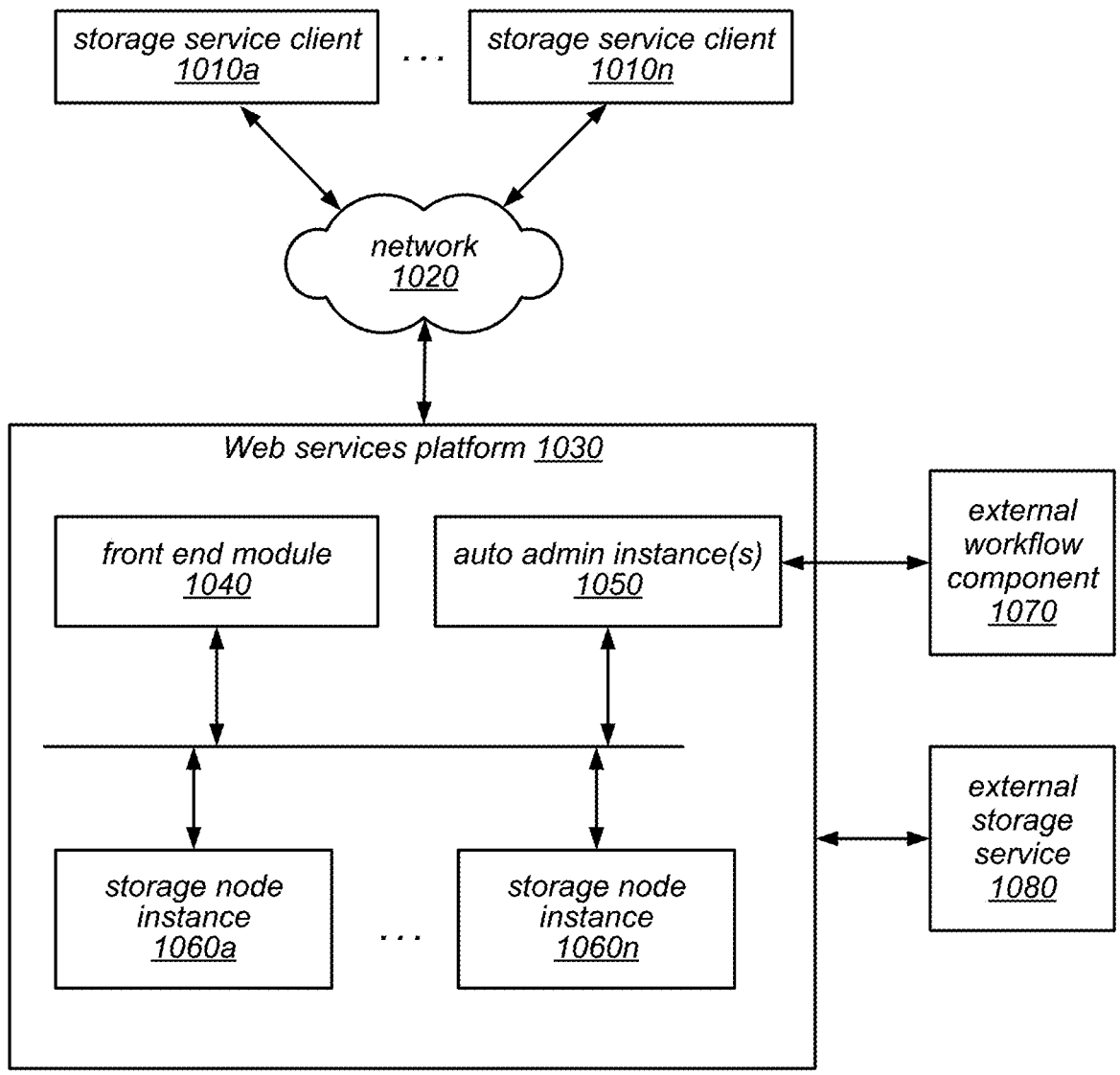
FIG. 10 is a block diagram illustrating one embodiment of a system architecture that is configured to implement a web services-based database service.

FIG. 7 is a high-level flowchart of a method for establishing a consistent distributed computing file system (DCFS) for a distributed computing system (DCS), according to at least some embodiments. The distributed computing system may be implemented according to a distributed computing framework. A non-limiting example of a framework that may be used in embodiments is Apache™ Hadoop®. As indicated at 700, a client configures a distributed computing system (DCS) via a distributed computing service. For example, the client may access one or more APIs of the DCS to request provisioning of computation and storage resources on a provider network for a specific DCS to store and process a data set. As indicated at 702, the distributed computing service provisions one or more compute nodes and a distributed computing file system (DCFS) for storing data objects of the DCS according to the client's input. The one or more compute nodes may, for example, be provisioned as or on resource instances in the client's private network implementation on the provider network. However, the compute nodes may also be provisioned elsewhere, for example on computing devices on the client's eternal network. The DCFS may be provisioned via an unstructured object storage service, for example as illustrated in FIG. 1. As indicated at 704, the distributed computing service provisions a DCFS directory for the DCS via a data storage service, for example an embodiment of a database service as described in the section titled Data storage service example and as illustrated in FIG. 10. Metadata for data objects in the DCFS may be stored to and maintained in the DCFS directory. As indicated at 706, the compute nodes may then access data objects in the DCFS according to metadata maintained in the DCFS directory rather than through metadata maintained by the unstructured object storage service, as the metadata maintained by the unstructured object storage service is only eventually consistent while the metadata maintained by the data storage service is strongly consistent.

In at least some embodiments, at 706, to access data objects in the DCFS according to metadata maintained in the DCFS directory, a compute node may access the DCFS directory to obtain strongly consistent metadata for one or more data objects stored in the DCFS. The compute node may then access the unstructured object storage service using the strongly consistent metadata obtained from the DCFS directory to obtain the one or more data objects stored in the DCFS for processing.

In at least some embodiments, at least some data objects that are accessed at 706 may be locally cached by the one or more compute nodes. In these embodiments, a compute node may check the cache for requested data objects prior to accessing the data objects from the DCFS. If a requested data object is in the cache, the data object may be obtained from the cache for processing rather than from the DCFS. If the requested data object is not in the cache, the compute node may then access data objects in the DCFS according to metadata obtained from the DCFS directory.

Figure 8:
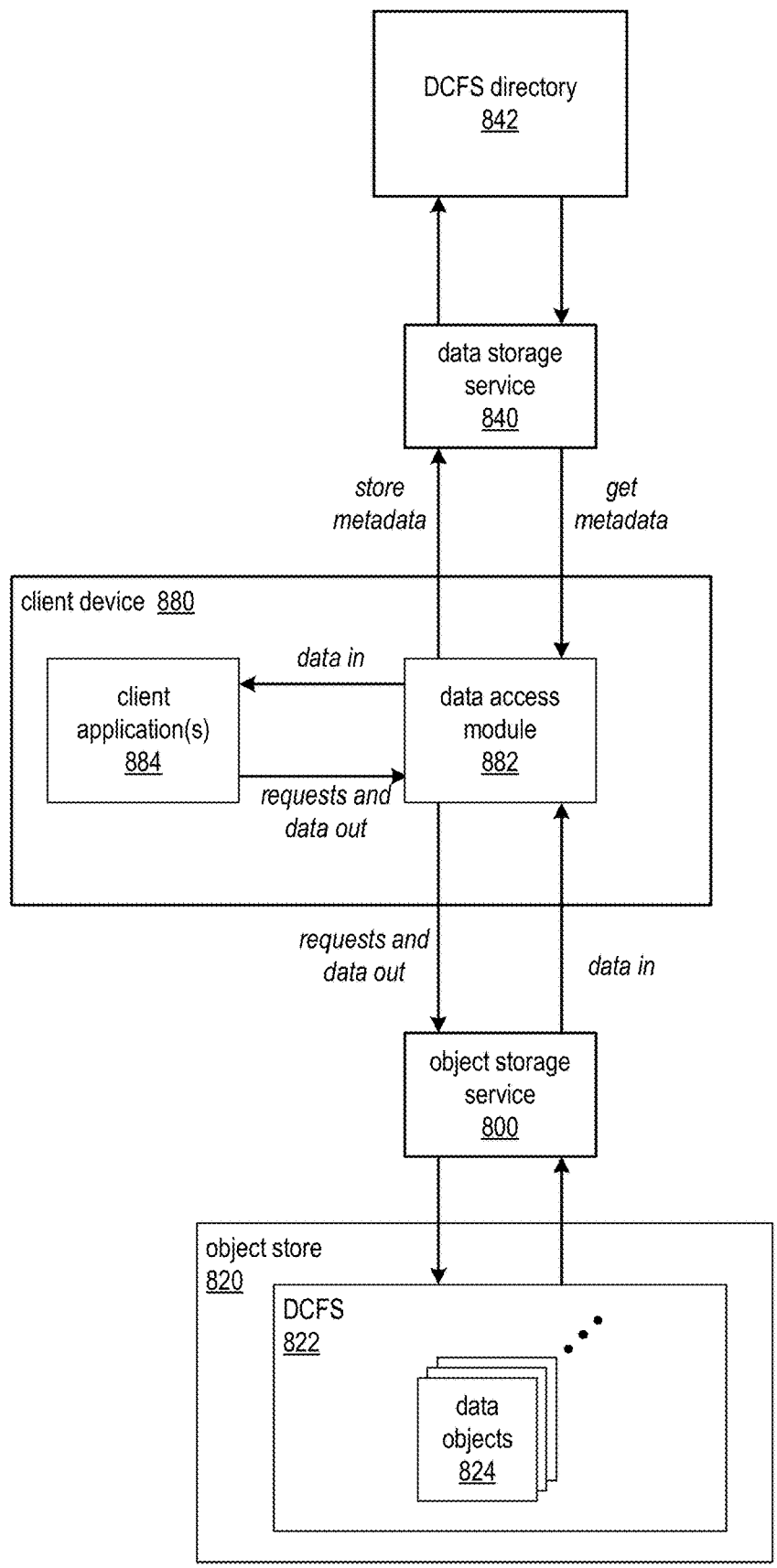
FIG. 8 illustrates a client device accessing a DCFS on an object store according to a DCFS directory, according to at least some embodiments.

While FIGS. 4 through 7 are generally directed to compute node(s) in a distributed computing system (DCS) accessing data objects from a distributed computing file system (DCFS) stored according to an unstructured object storage service according to metadata stored in a DCFS directory according to a data storage service, in at least some embodiments other entities may access the DCFS according to a DCFS directory. FIG. 8 illustrates a client device accessing a DCFS on an object store according to a DCFS directory, according to at least some embodiments. In at least some embodiments, a client device 880 may include one or more general or specific applications 884 for processing data. The client device 880 may also include a data access module 882 that is configured to access DCFS directory 842 via data storage service 840 to obtain metadata for the DCFS 822, and that may access data objects 824 in DCFS 822 on object store 820 via object storage service 800 according to the metadata obtained from the DCFS directory 842. Via a client device 880 configured with the data access module 882, a client or user may access the DCFS 822 according to consistent metadata in DCFS directory 842 to perform one or more of various operations (e.g., creating, editing, modifying, renaming, moving, copying, and/or deleting data objects 824) independently of a DCS implementation 670 as shown in FIG. 6. Accessing the DCFS 822 via data access module 882 may insure that consistency is maintained in DCFS directory 842, and that changes to metadata in DCFS directory 842 are propagated to the DCFS 822. Thus, even if there are no compute nodes currently provisioned for a DCS implementation that uses the DCFS 822, a client may access the DCFS 822 and the DCFS directory 842 to perform various operations on the data objects in the DCFS 822 as necessary or desired while maintaining the strong consistency provided by the data storage service 840.

Figure 9A:
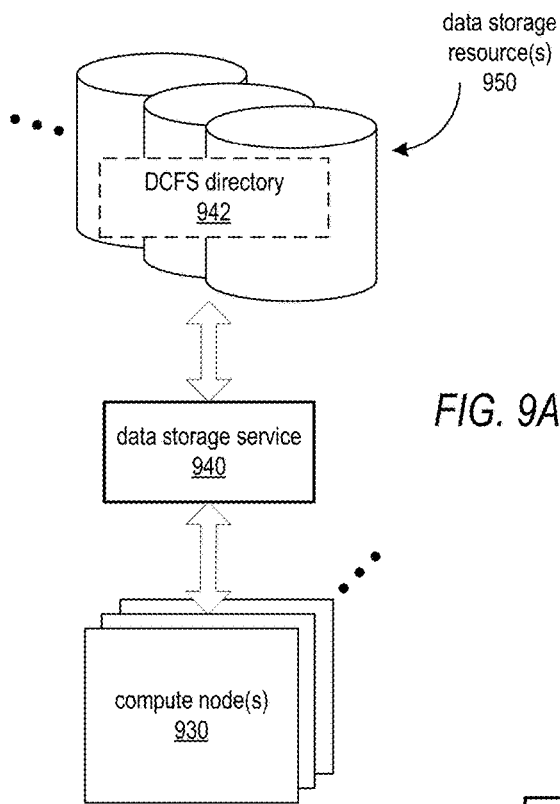
FIGS. 9A through 9C illustrate example implementations of a DCFS directory, according to some embodiments.
Figure 9B:
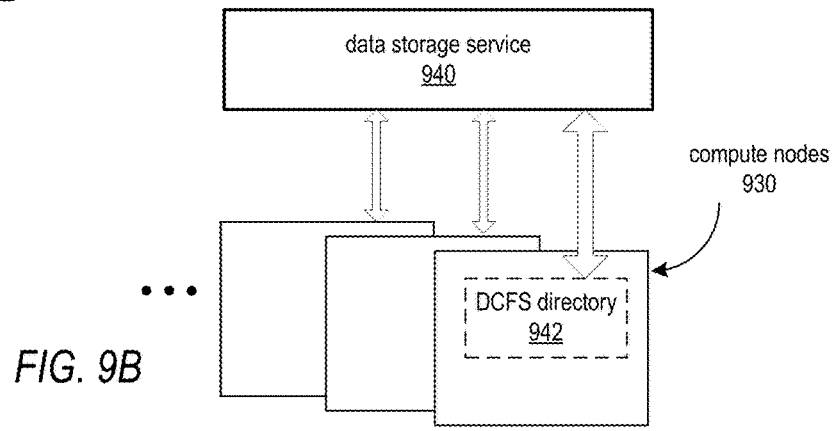
Figure 9C:
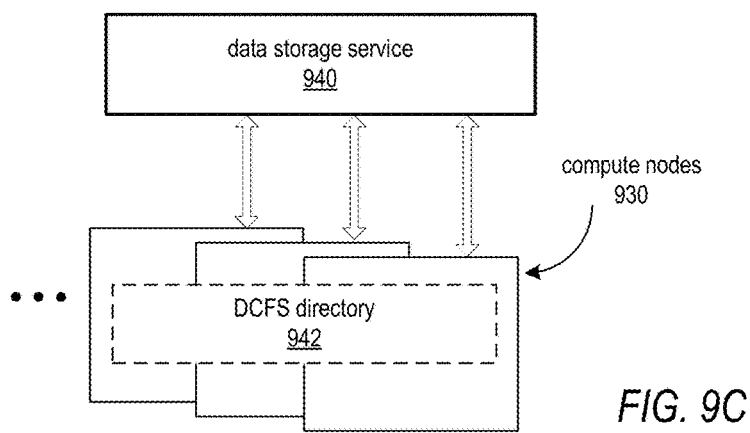

FIGS. 9A through 9C illustrate example implementations of a DCFS directory, according to embodiments. As illustrated in FIG. 9A, in at least some embodiments, a DCFS directory 942 may be implemented as or provisioned on one or more data storage resources 950 of a data storage service 940. In some embodiments, data storage resources 950 may be virtualized storage resources provided to clients of a service provider via a provider network, and may be implemented on multi-tenant storage hardware that is shared among two or more clients. One or more compute nodes 930 of a distributed computing system (DCS) may access the DCFS directory 942 via API(s) to the data storage service 940. As illustrated in FIG. 9B, as an alternative, a portion or all of the DCFS directory 942 may be implemented on one of the one or more compute nodes 930 of the DCS. As illustrated in FIG. 9C, as another alternative, a portion or all of the DCFS directory 942 may be implemented as a distributed directory across two or more compute nodes 930 of the DCS. In both FIGS. 9B and 9C, in at least some embodiments, the one or more compute nodes 930 of the DCS may access the DCFS directory 942 stored on the compute nodes 930 via API(s) to the data storage service 940. Note that other alternative implementations of the DCFS directory 942 are possible.

Embodiments of the DCFS methods and apparatus as described herein may improve on conventional DCFS implementations in distributed computing system implementations by augmenting the highly available, reliable, and high-throughput data storage provided by an unstructured object storage service 400 with the consistency provided by a data storage service 440, for example a database service provided by the service provider. Embodiments of the DCFS may be viewed as a replacement for a conventional DCFS as illustrated in FIGS. 1 through 3, with consistency guarantees enforced by the data storage service 440. Features of the DCFS may include one or more of, but are not limited to:

Server-Side (object storage service side) encryption support.

Client-Side encryption support.

Atomic and fast directory and file rename support.

File appends.

Multi-part uploads.

Cached reads for seeks.

By implementing both sides of the interface (the client side, e.g. via a data access module or library as shown in FIG. 5, and services on the server side), embodiments may provide file-level features, such as file appends and file renaming, on top of the object storage service, which is eventually consistent. In addition, by doing file caching locally on the compute nodes as shown in FIG. 5, as well as synchronizing in the background and leveraging the data storage service, very fast performance may be provided.

These and other features of embodiments of the consistent DCFS methods and apparatus are further described below in more detail.

Consistent DCFS Details

In an unstructured object storage service as illustrated in FIG. 1, the unstructured object storage service may provide eventual consistency, and thus mapping from names to data objects in the metadata maintained by the unstructured object storage service is not strongly consistent. The names of newly written objects may not be visible to all clients after the object is written for several minutes or (in some cases) days. Deleted names may be visible to some clients after the name has been deleted. If a name is reused, different clients may see any of the objects that were previously assigned the same name. Different read requests from the same client can potentially return bytes from different data objects.

This causes a variety of problems for common distributed computing system (e.g., Hadoop®) workflows when using conventional distributed computing file system (DCFS) implementations. For example, a job (e.g., a MapReduce job) may write output to files in an output directory of the DCFS. A subsequent job (e.g., another MapReduce job) expects to be able to list the contents of the output directory from the first job in order to determine the data it to be processed. If there are object names (according to the object storage service) missing from the list, then the second job may proceed to process partial data without being able to detect that the input dataset is incomplete. This can result in inaccurate output with no indication that there was a problem.

In cases where files are overwritten (e.g., a name is reused for different objects), a reader may get mismatched parts of files without a simple way of detecting this.

In addition, deleted files may be erroneously included in a subsequent MapReduce job's input set. In some cases the deleted file may be processed, yielding inaccurate output. In other cases, worker nodes in the MapReduce job may no longer be able to read the deleted file once the job begins, causing the MapReduce job to fail. This last case is an annoyance, and may cause extremely long-running jobs to fail after many resources have been consumed, so while this last case is often better than producing incorrect results, it can still be very costly.

Another mismatch between an unstructured object storage service's name-object mapping and distributed computing system (e.g., Hadoop®) use-cases is that renaming objects in the object storage service may not be fast. A particular distributed computing system (e.g., a system according to the Hadoop® framework) application may use file or directory renaming as an inexpensive way to indicate work completion. However, the unstructured object storage service may not provide a mechanism to rename objects other than to copy the files to the new names and delete the old names. This makes moving directories a slow and potentially expensive proposition.

An unstructured object storage service as illustrated in FIG. 1 may provide extremely high reliability and high throughput, and may be a natural fit for processing "Big Data". However, as described above, the unstructured object storage service may not provide the consistent file system model and semantics that a distributed computing system framework (e.g., Hadoop®) may assume. Thus, a robust and highly consistent distributed computing file system (DCFS), referred to herein as consistent DCFS, may be built on top of unstructured object storage service that leverages a fast, highly available, and strongly consistent data storage service (e.g., a database service as illustrated in FIG. 10) for file system structure and metadata in distributed file system implementations.

In at least some embodiments, the consistent DCFS may be an implementation of the Hadoop® FileSystem API built on an unstructured object storage service (see, e.g., FIG. 1) and a data storage service (e.g., a database service as illustrated in FIG. 10) as described herein to provide a consistent, highly available, highly reliable, and high-throughput Hadoop® FileSystem. However, note that embodiments of the consistent DCFS may be implemented according to other distributed computing frameworks than Hadoop®.

In at least some embodiments, the consistent DCFS may use a data storage service (e.g., a database service as illustrated in FIG. 10) to implement a consistent DSFS directory according to a directory structure that is similar to POSIX-style file systems. The consistent DCFS may store directory descriptions for each subdirectory and file in the file system as metadata to the consistent DSFS directory. The stored file metadata in the consistent DSFS directory contains unique identifiers for each underlying object in the object store maintained by the unstructured object storage service, allowing the consistent DCFS to ensure that contents of only the intended objects are returned from the object store.

In at least some embodiments, the directory structure of the consistent DSFS directory enables faster file and directory renaming than in conventional systems. Moreover, renames in the consistent DCFS as described herein leverage the consistent DSFS directory, and are atomic and fast.

In at least some embodiments, to ease migration to the consistent DCFS from conventional DCFS, transparent access may be provided to existing data stored in the object store via the unstructured object storage service by conventional DCFS as well as by any other client. Unstructured object storage service files created by other clients may be visible in the consistent DCFS. While access to files created by non-consistent DCFS clients will not have enhanced consistency guarantees, this does make migration to consistent DCFS very simple. Note that a client that is enabled to access the consistent DCFS may be referred to herein as a consistent DCFS-enabled client, or consistent DCFS client, while a client that is not so enabled may be referred to herein as a non-consistent DCFS client.

In at least some embodiments, data that is to be part of a job flow in a DCS that implements consistent DCFS should be uploaded to the object store using consistent DCFS-enabled clients. Likewise, for consistent and reliable data transfers, consistent DCFS clients should be used to access or copy data from conventional object storage into a consistent DCFS implementation.

In at least some embodiments, a user may not wish to switch to consistent DCFS clients. For example, if a user wishes to migrate away from consistent DCFS in the future, the user may wish to do so without copying everything from a consistent DCFS to conventional object storage first. In at least some embodiments, files stored in consistent DCFS may be viewed with non-consistent DCFS clients, although there may be some caveats. In at least some embodiments, to support fast file and directory renames, consistent DCFS modifies or changes metadata in the DCFS directory instead of moving data objects as is done in an object storage service as illustrated in FIG. 1. Therefore, non-consistent DCFS clients viewing the files may see any consistent DCFS-renamed files under their original names. This may be an undesirable state, and embodiments of consistent DCFS may provide solutions including but not limited to the following.

As a solution, in at least some embodiments, a process or agent may run continuously on one or more servers (see, e.g., DCS agent(s) 672 in FIG. 6). The agent may watch for differences between object storage service and consistent DCFS names, and may perform the slower object copies as is done in an object storage service as illustrated in FIG. 1 to make the object store naming match the consistent DCFS structure as indicated in the DCFS directory. The consistent DCFS process or agent may provide eventually consistent views to non-consistent DCFS clients.

In at least some embodiments, another solution is to run a consistent DCFS file synchronization job, e.g. a MapReduce job, specifying the directories under which to ensure consistency. This solution may be used, for example, in cases where a non-consistent DCFS client may need a level of consistency. The file synchronization job may guarantee that any consistent DCFS rename performed before the job began will be reflected in the underlying object store when the job successfully completes. By adding an invocation of the synchronization job to an existing workflow, users can make renamed files ready for use by any non-consistent DCFS client. In at least some embodiments, non-consistent DCFS clients will not have any enhanced consistency guarantees over those provided by the underlying object storage service.

Consistent DCFS Interactions

In at least some embodiments, consistent DCFS stores all files in an object store according to the underlying object storage service (see, e.g. FIG. 1), and attempts to keep the object storage service's metadata and file names in sync with consistent DCFS's view of the file system as maintained in the DCFS directory according to the data storage service. The view between the object storage service and consistent DCFS may be temporarily out of sync for reasons including the following.

First, the object storage service's eventual consistency means that the object storage service may not always have the same structure even if consistent DCFS has made the appropriate updates to the object storage service.

Another reason that consistent DCFS and the object storage service may mismatch is due to performing fast file or directory renames using consistent DCFS. In at least some embodiments, the object storage service does not rename files, instead using a slow copy and delete procedure. Fast file and directory renames may be useful in distributed file system (e.g., Hadoop®) applications, and so consistent DCFS may enable renames of data objects by updating metadata in the DCFS directory first, and performing object storage service operations in the background to obtain eventual consistency while letting distributed file system (DFS) applications continue with the updated view of the metadata in the DCFS directory.

In at least some embodiments, files that already exist in the object storage service, or that are written to the object storage service by non-consistent DCFS clients, are also transparently visible to consistent DCFS clients. In at least some embodiments, when consistent DCFS needs to return a list of a directory about which it has incomplete information, it performs the list operation on the object storage service and merges the results with the partial metadata stored in the DCFS directory.

In some cases, the object storage service may have the only record of the existence of a file and consistent DCFS has never seen the file before. In this case, consistent DCFS passes the data about the object storage service file on to the caller.

In some cases, the object storage service has a file and consistent DCFS also has information about the file (e.g., metadata in the DCFS directory). As an example, consistent DCFS may be asked to delete a file. In at least some embodiments, consistent DCFS marks the metadata in the DCFS directory via the data storage service as being deleted and tells the object storage service to delete the object. In at least some embodiments, if, while listing the directory, the object storage service returns the deleted file name (due to consistency delays), consistent DCFS may join the file name against the record in the DCFS directory to recall the file that was deleted, in which case the data from the object storage service for the file is masked out. In at least some embodiments, similar masking happens for renamed files and for name-collisions (discussed later).

In addition, there may be cases where consistent DCFS's metadata contains records of files that the object storage service does not report. This may, for example, be because of the object storage service eventual consistency, or because consistent DCFS was asked to rename a file or directory and has not completed copying the object storage service files to their new names (which consistent DCFS will do in the background while allowing consistent DCFS clients to see the updated names immediately). In these cases, in at least some embodiments, consistent DCFS may augment the directory listing with information from the DCFS directory.

In at least some embodiments, consistent DCFS provides strong consistency for files or other data objects in the object store that are read and written using consistent DCFS by storing metadata about the files and directories in the DCFS directory, for example according to a data storage service such as a database service. The DCFS directory is the authoritative store for the DCFS directory structure, but may be supplemented by object storage service metadata when required.

The section titled Data storage service example and FIG. 10 describe a non-limiting example database service that may be used in at least some embodiments of consistent DCFS to store and maintain consistent DCFS directories. In some embodiments, the database service may be a fast, fully managed NoSQL, non-relational database service that makes it simple and cost-effective to store and retrieve any amount of data, and to serve any level of request traffic. In some embodiments, the NoSQL database service may provide databases as key-value stores for clients' data. The key-value stores provided by the NoSQL database service allow clients to store their data without fixed schemas. In some embodiments, at least some of the data items may be stored on Solid State Drives (SSDs). In some embodiments, at least some of the data items may be replicated, for example across three locations, for high availability and durability.

While the DCFS directory is generally described herein as a key-value store, various other suitable types of data schemas or data tables may be used for the DCFS directory in some embodiments. For example, in some embodiments, a relational database (RDB), which may be provided by a relational database service, may be used for the DCFS directory, and the metadata may be maintained as or in relational tables.

In at least some embodiments of the consistent DCFS and the DCFS directory, a directory is a collection of directory entries. Each directory entry contains a name of another file or directory, and any information required to access the corresponding file or directory.

In at least some embodiments, the DCFS directory schema may enable fast and efficient joins with the object storage service file listings. In at least some embodiments, the schema may also enable fast and atomic renames of files or directories. In at least some embodiments, the schema may be efficient for navigating as a directory tree. However, a schema may not enable all of these requirements without making some trade-offs. Therefore, in at least some embodiments, consistent DCFS may optimize for the common case. In the common case:

Consistent DCFS's name for a file or directory matches the object storage service name.

Consistent DCFS's renaming of directories (in common distributed file system (e.g., Hadoop®) workflows) is usually performed at the end of writing new files to the directory. It can be less efficient to add to a renamed directory for a time.

Files and directories written by consistent DCFS clients are not frequently overwritten or deleted by non-consistent DCFS clients while consistent DCFS clients are still accessing them.

In at least some embodiments, consistent DCFS may add minimal latency to operations on the object storage service, and may be economical in its use of data storage service provisioned capacity (IOPS).

DCFS Directory

In at least some embodiments, for performance of joining directory entries with the object storage service, consistent DCFS may use database keys that can be easily queried for a given directory path. The directory path name could be used as a hash key, but the actual path string is not stable (as directories and files can be renamed).

Thus, in at least some embodiments, consistent DCFS uses a hash technique for keys in the DCFS directory in which the md5sum of a directory path is used as the hash key for a corresponding directory entry. The range key is the name of the file or directory. Note that the MD5 message-digest algorithm is a cryptographic hash function that produces a 128-bit (16-byte) hash value, and md5sum is a computation method that calculates and verifies 128-bit MD5 hashes (or checksums), as described in Network Working Group Request for Comments (RFC) 1321. This method makes it possible to find a directory entry given any file or directory name. Note, however, that other hash techniques may be used in some embodiments. Additionally, in at least some embodiments, the entries of a given directory are sorted lexicographically (e.g., in the same sort order as in the object storage service) and can easily be queried. This arrangement allows for lazy-loading of sorted directory contents from both the object storage service and the data storage service, enabling merge, sort, and join operations.

In at least some embodiments, the information stored in a directory entry that is important when merging with an the object storage service listing may include, but is not limited to:

Should the file (or directory) be visible to users, or has it been deleted, renamed, or does it exist (temporarily) for consistent DCFS internal implementation reasons.

Known information that may identify the version of the file in the object store. For example: ETag (entity tag), file size, modification date, file metadata, etc.

For a directory, is the information in the DCFS directory complete and authoritative, or does the object storage service need to be consulted for listing operations.

In practice, this information serves two purposes. First, it enables consistent DCFS to filter out files from listings where consistent DCFS already contains authoritative information. Second, it enables consistent DCFS to ensure that all clients are seeing the same version of a named file, even if the file name has been reused.

In at least some embodiments, the data mentioned above is strongly connected with the object storage service data object it describes. The data is about the object storage service file and the object storage service file cannot quickly move to a different path, so the information does not frequently need to move to a different hash/range key in the DCFS directory. There may be other information that may be stored in the DCFS directory, but that information is strongly connected to the logical name of the file, not to the bytes of the file stored in the object storage service.

In at least some embodiments of a consistent DCFS, a directory may be modeled as an object with a few operations. Example operations are given below, and are not intended to be limiting:

mkdir(name)—create new Directory and reference it from a new directory entry with the given name.

openDir(name)—return a Directory described the directory entry with the given name.

createFile(name)—create a directory entry with the given name that describes how to store and retrieve a sequence of bytes.

openFile(name)—use the description in the directory entry with the given name to retrieve the previously stored sequence of bytes.

stat(name)—describe the directory entry with the given name (if such an entry has been created).

list( )—return a list of descriptions of directory entries that exist.

rename(sourceName, destinationDirectory, destinationName)—copy or move the directory entry with the given sourceName to the destinationDirectory where is should be stored with the new destinationName. Note that destinationDirectory may be the same object as this directory.

In at least some embodiments, to support these operations, the directory entries need to be able to describe how to read a file for the given name from the object store. For example, using the object storage service as illustrated in FIG. 1, an entry in the DCFS directory may include at least the object storage service bucket name and key. For directory entries describing directories, an entry needs to contain information sufficient to find DCFS directory records (directory entries) sufficient for the Directory object to perform the tasks listed above.

Again, the information described above may be strongly tied to the logical name in the consistent DCFS. When a file or directory is moved in the object store, this name-bound information needs to move with the name. In at least some embodiments, this divides the contents of a directory entry into two parts: name-bound and storage-bound. Usually (the common case), both the name-bound and the storage-bound information are stored together in the same DCFS directory entry, because the consistent DCFS logical name usually matches the name of the backing files stored in the object storage service. When a file or directory is renamed in consistent DCFS, however, the name-bound information needs to move with the name, and the storage-bound information should remain in the original DCFS directory record, until the underlying object storage service storage is successfully synchronized with consistent DCFS (for example, by doing many copy and deletes of object store files).

In at least some embodiments, there may be another orthogonal partitioning of directory entry information. The information required to describe a directory differs from the information required to describe a file. In many file systems a given name can be a file or a directory, but not both. In those systems, a directory entry is either a file-describing entry or a directory-describing entry. The object storage service, however, allows the same name to describe a file or a directory. In at least some embodiments, to transparently overlay existing object storage service data, consistent DCFS may support directory entries with this dual nature. For the DCFS directory schema, this means each directory entry (represented in one DCFS directory record) may contain some, none, or all of the following categories of information:
 file-describing name-bound.
 file-describing storage-bound.
 directory-describing name-bound.
 directory-describing storage-bound.
 entry-bound (the hash key, range key, and atomic version number).

The "entry-bound" category may define a DCFS directory record, and in at least some embodiments may be required for all records in the DCFS directory schema.

Consistent DCFS Rename Operations

In at least some embodiments, the rename operation on consistent DCFS files and directories is fast. In at least some embodiments, to make this possible for directories (of any size), the rename operation cannot manipulate directory entries contained within a moving directory. Consider the following series of steps:
 1. mkdirs(CDCFS://example/foo/bar/)
 2. create(CDCFS://example/foo/bar/hello1.txt)
 3. rename(CDCFS://example/foo/bar, CDCFS://example/foo/BAZ)
 4. create(CDCFS://example/foo/BAZ/hello2.txt)
 5. rename(CDCFS://example/foo/BAZ, CDCFS://example/foo/ZOOP)
 6. create(CDCFS://example/foo/ZOOP/hello3.txt)

This behavior is not the common case, but it is acceptable behavior and thus should be supported by consistent DCFS. However, performance may be allowed to degrade slightly to support this behavior. Note however, that the data structures to support this behavior become more complicated in all cases, even though performance for the common case is not degraded significantly.

In the example, a directory is created and a file is created inside it. The directory is then moved to a new name, wherein a second new file is created. Finally, the same directory is renamed to yet another new name wherein a third new file is created. Each new file is created in the same directory, even though the name of the directory has changed. All the files that existed in BAZ before the move to ZOOP must be present in ZOOP after the move. Even in a renamed directory, consistent DCFS needs to maintain the common-case optimization of storing the name-bound and storage-bound information in the same DCFS directory record, when possible.

In at least some embodiments, this may be accomplished by consistent DCFS using directory splitting. When listing or looking up directory entries, the Directory must check each hash key from a set of hash keys, recorded in the Directory's own directory entry (the directory entry in the parent directory that points to this Directory). This list only has one hash key in most cases, but if a directory is renamed and then written to, the new entry will have a different hash key, which is recorded in the list of hash keys. List operations can perform merge sorts for the query results from each hash key. Finally, the number of hash keys is bounded to a size to keep the record under one IOP (1K, for example), after which consistent DCFS gives up on keeping name-bound and storage-bound information in the same record as the IOPS cost savings is lost by having a large parent directory entry.

Now, consider another legal but rare sequence of operations:
 1. mkdirs(CDCFS://example/foo/bar/)
 2. create(CDCFS://example/foo/bar/hello1.txt)
 3. rename(CDCFS://example/foo/bar, CDCFS://example/foo/BAZ)
 4. mkdirs(CDCFS://example/foo/bar/)
 5. create(CDCFS://example/foo/bar/hello1.txt)
 6. rename(CDCFS://example/foo/bar, CDCFS://example/foo/ZOOP)
 7. mkdirs(CDCFS://example/foo/bar/)
 8. create(CDCFS://example/foo/bar/hello1.txt)
 9. rename(CDCFS://example/foo/bar, CDCFS://example/foo/ZOOP)

In this case, rename is used to allow three different files to be created with the same path name, but in three different directories.

Supporting this behavior requires supporting two different kinds of name collision. First, the object storage service file for the first incarnation of foo/bar/hello1.txt still exists following the first rename. The second creation of foo/bar/hello1.txt is technically in a new directory, but the underlying storage path of choice is not available. In at least some embodiments, consistent DCFS detects this case and creates a new temporary file name in the same directory. The storage-bound metadata for the temporary file prevents the object storage service file from being visible to consistent DCFS users under the temporary name. The name-bound information is in a separate DCFS directory record and references the temporary file name. This kind of name collision can happen for multiple reasons and is fairly easy to cope with, though it may increase the number of required reads from the DCFS directory for these collided files.

Another kind of name collision that exists in this example may be harder to handle. In the example, the name-bound file-describing information for three different files will all map to the same hash key and range key (/hello1.txt). Some mechanism is required for chaining this kind of name collision. In at least some embodiments, consistent DCFS solves this by giving every directory a globally unique directory ID. Consistent DCFS then stores all name-bound information in a map. The key of the map is the directory ID of the parent directory that owns the name-bound information that is stored in the value of the map. The resulting structure is generally just as fast, and most entries are not going to grow too large (in the absence of collision, there is at most one entry in each map), however the resulting schema may be a little less obvious.

Example Consistent DCFS Operations

In at least some embodiments, consistent DCFS may implement the Hadoop® FileSystem API. In at least some embodiments, the implementation is a small wrapper around a set of classes, for example the Directory and DirectoryEntry classes. This section walks through the various operations of the Directory class and describes how the structures of the DirectoryEntry (as implemented by the DCFS directory schema described above) may be implemented and used in at least some embodiments.

List Operation

In at least some embodiments, a directory may be listed by checking if the directory was "Discovered" or "Authoritative" for the information. A discovered directory may query the object storage service to supplement the listing, joined with the DirectoryEntry(s) from the one hash key that matches the current path of the directory being listed.

In either case, the directory also has a list of hash keys under which contained directory entries might exist, as well as a unique directory ID. Each hash key is queried and the resulting iterators are merge-sorted together, resulting in an iterator over a single sorted sequence of potential directory entries. The list may be filtered by removing directory entries that do not have directory or file name-bound information under the listing directory's directory ID.

In at least some embodiments, for the majority of "Authoritative" directories, the list operation results in a single query over one DCFS directory hash key. For the majority of "Discovered" directories, the list operation results in an object storage service list and a single query over one DCFS directory hash key. In at least some embodiments, the iterator over name-bound information coincides with the iterator over storage-bound information, and only one iterator (query) is required to fill both roles.

Stat Operation

In at least some embodiments, at least some functions may begin by checking for collisions and loading any pre-existing records with the stat operation. In at least some embodiments, the stat operation loads DCFS directory records corresponding to a given name. The entry may not exist, in which case there is no name or file with that name in the directory. The entry may exist, but still have none of the directory-describing or file-describing information with the appropriate directory ID. Or, the entry may have information describing a file and/or a directory. To find the record, each hash key from the directory's list of keys must be checked. Usually this is just one key. However, it can be an empty list if the directory is empty, or may be more if the directory or its ancestors have been renamed.

In at least some embodiments, the records returned from the stat operation can be updated and saved to the DCFS directory to affect the desired changes to the file system. The record can also be read to confirm the existence of the named file or directory, and to return information about the file or directory. In at least some embodiments, a stat operation call for a name on a "Discovered" directory that would return no record from the DCFS directory may instead call the object storage service list to check for an appropriate file and/or directory in the object storage service. A directory discovered this way is "Discovered", just like its parent directory. "Authoritative" directories periodically behave like "Discovered" directories to eventually detect changes made to the object storage service object store by non-consistent DCFS clients, but this is infrequent.

mkdir

In at least some embodiments, a directory object has a path that is not stored in the DCFS directory explicitly, but that path is assembled from the directory names of each directory between the root and the path's final name segment. In at least some embodiments, the path of the directory is md5summed to create the default hash key under which a new directory entry should be created. However, the ordered list of hash keys previously used for this directory (due to renames of the directory or a parent of the directory) may be consulted. In at least some embodiments, the list is ordered, and an entry which is present in the list cannot be moved. In at least some embodiments, if the new hash key is not in the list, it may be prepended to the list. In any case, in at least some embodiments, the new entry hash key MUST match the first hash key in the list. This requirement makes atomic name creation easier. If new files/directories could be simultaneously created under multiple hash keys for the same directory, different attempts to create an entry may collide, and one or the other will fail. In at least some embodiments, the remainder of the list of hash keys is present to be able to find preexisting directory entries, but only the first key in the list can be used to create new entries.

In at least some embodiments, the common case for mkdir requires exactly two reads and one write operation to the DCFS directory. Worst case (due to renames) requires the list of hash keys to be updated in the parent directory's entry, resulting in a total of three read and two write operations.

createFile

In at least some embodiments, files created via consistent DCFS appear in consistent DCFS listings as zero-length files immediately after the call to createFile returns, thus behaving like most other file systems. In at least some embodiments, the record written to the DCFS directory contains a unique randomly generated File ID that will be written to object storage service metadata. In at least some embodiments, best-effort attempts to update the DCFS directory with information including one or more but not limited to ETag, file size, modification time, and (optionally) object storage service version ID can be made once the object is uploaded to the object storage service. If no other DCFS directory update occurs, attempts to perform a stat operation on or read the file may result in object storage service lookups. The first client to open or perform a stat operation on the file can then write additional information about the file to the DCFS directory so that all other clients will be guaranteed to access the same version of the file. This prevents a large upload from being invisible due to a failure to follow-up with a second DCFS directory update.

In at least some embodiments, the stat operation may be used to detect a possible object storage service object collision, for example as in an explicit object storage service call to get metadata for an object. In at least some embodiments, if a collision is found, a random unique name may be generated for a file in the same directory, storage-bound information may be written for the new object storage service file name, and the name-bound information may be updated in record(s) returned from the stat operation.

openFile

In at least some embodiments, stat is used to find the file name-bound information. This information at least points to an object storage service path (usually the same path). In at least some embodiments, the object storage service getObject request may be qualified with information including one or more of ETag, creation date, or object storage service version ID, if the information is available. Otherwise, the getObject is unqualified and the returned object's metadata may be checked against the unique file ID recorded in the directory entry. If there is no match a retry may be attempted and ultimately an error may be returned. In at least some embodiments, if identifying information exists and includes a lastModified date, and a file in the object storage service object store is found with a more recent lastModified date, it can be assumed that a non-consistent DCFS client has overwritten the file and that the new version should be considered "Discovered", and the parent directory should be marked as "Discovered" as well, if not already so marked.

In at least some embodiments, the InputStream returned from openFile may use local files to store portions of a read file. This enables fast seeking over already-read information and enables some read-ahead caching as well. In at least some embodiments, this cache may be a distributed cache, and may allow clients to optimize for reusing the local files on different machines.

deleteFile

In at least some embodiments, deleting a file is performed on the object storage service and recorded in the DCFS directory. In at least some embodiments, the record is not removed from the DCFS directory because the storage-bound information needs to mask the object storage service file as it may continue to appear due to eventual consistency.

File System Synchronization

In at least some embodiments, a mechanism (e.g., an API call for initiating a synchronization job or process) may be provided to synchronize DCFS directory information and object storage service objects if they go out of sync, for example as a result of move or other operations performed on the object store.

Data Storage Service Example

The following describes an example database service or data storage service that may be used as the data storage service in at least some embodiments.

A Web-based service is described that provides database services to clients (e.g., user, subscribers, or client applications that access the data storage service on behalf of users or subscribers). The database service may in some embodiments support the seamless scaling of tables that are maintained on behalf of clients in a non-relational data store, e.g., a non-relational database. The database service may provide a high level of durability and availability through replication, in some embodiments. In some embodiments, the database service itself may not impose a maximum table size or maximum throughput limits, and may not require client-side partitioning, even for tables having a massive scale. The database service may support automatic live repartitioning of data in response to the detection of various anomalies (e.g., failure or fault conditions, hot spots, or increases in table size and/or service request throughput), and/or explicit (e.g., pro-active and/or subscriber-initiated) live repartitioning of data to support planned or anticipated table size and/or throughput increases. In other words, the database service may in some embodiments initiate the re-sizing (scaling) and/or repartitioning of a table in response to receiving one or more requests to store, retrieve, modify, or delete items in the scaleable table.

The database service may in various embodiments support a flexible schema, a plurality of available consistency models, a variety of service level and/or business model options, multiple indexing options, and/or multiple query types. In some embodiments, clients (e.g., users, subscribers or client applications) may interact with the database service through a Web service interface using a relatively small (and relatively simple) set of APIs, such that clients of the service are largely relieved from the burden of database administration. The database service may exhibit low latency in servicing requests. Unlike in some prior data storage services, the database service may provide predictable performance at a low cost, while supporting multi-tenancy and automatic heat management.

In various embodiments, the database service may provide an application programming interface (API) that includes support for some or all of the following operations on the data in a table maintained by the service on behalf of a client: put (or store) an item, get (or retrieve) one or more items having a specified primary key, delete an item, update the attributes in a single item, query for items using an index, and scan (e.g., list items) over the whole table, optionally filtering the items returned. In some embodiments, the database service (and/or the underlying system that implements the database service) may support a strong consistency model, in addition to supporting eventually consistent read operations. In some embodiments, service requests made via the API may include an indication of one or more user preferences, such as a preferred consistency model, a preferred service request throughput level, or a service request throughput level for which a guarantee is requested. In other embodiments, some or all of these user preferences may be specified when a table is created, or may be client-specific, account-specific, specific to various table types, or specified by system-wide default values, rather than being specified on a per-request basis. The API may support extreme scaling and/or more predictable performance than that provided by prior data storage systems and services.

In some embodiments, the database service (and/or the underlying system) may impose an upper bound on the size of an individual item, e.g., to allow the database service to store the entire contents of an item in a single partition in the underlying data storage system. This may, in turn, facilitate performing atomic updates to an item without dramatically reducing throughput, and may make it easier to maintain item contents in a stable working set. In other words, limiting the size of an individual item may facilitate both strong consistency and high performance in the system, in some embodiments.

In at least some embodiments, the database service may be a fast, fully managed NoSQL, non-relational database service that makes it simple and cost-effective to store and retrieve any amount of data, and to serve any level of request traffic. In at least some embodiments, the NoSQL database service may provide databases as key-value stores for clients' data. The key-value stores provided by the NoSQL database service allow clients to store their data without fixed schemas. In at least some embodiments, all data items are stored on Solid State Drives (SSDs). In at least some embodiments, all data items may be replicated, for example across three locations, for high availability and durability.

One embodiment of a system architecture that is configured to implement a Web services-based database service is illustrated in FIG. 10. It is noted that where one or more instances of a given component may exist, reference to that component may be made in either the singular or the plural. However, usage of either form is not intended to preclude the other. In various embodiments, the components illustrated in FIG. 10 may be implemented directly within computer hardware, as instructions directly or indirectly executable by computer hardware (e.g., a microprocessor or computer system), or using a combination of these techniques. For example, the components of FIG. 10 may be implemented by a distributed system including a number of computing nodes (or simply, nodes), such as the computer node embodiment illustrated in FIG. 15 and discussed below. In various embodiments, the functionality of a given storage service system component may be implemented by a particular computing node or may be distributed across several computing nodes. In some embodiments, a given computing node may implement the functionality of more than one storage service system component.

Generally speaking, storage service clients 1010a-1010n may encompass any type of client configurable to submit web services requests to Web services platform 1030 via network 1020. For example, a given storage service client 1010 may include a suitable version of a web browser, or a plugin module or other type of code module configured to execute as an extension to or within an execution environment provided by a web browser to provide storage service clients (e.g., client applications, users, and/or subscribers) access to the data storage services provided by Web services platform 1030. Alternatively, a storage service client 1010 may encompass an application such as a database application, media application, office application or any other application that may make use of persistent storage resources. In some embodiments, such an application may include sufficient protocol support (e.g., for a suitable version of Hypertext Transfer Protocol (HTTP)) for generating and processing web services requests without necessarily implementing full browser support for all types of web-based data. That is, storage service client 1010 may be an application configured to interact directly with Web services platform 1030. In various embodiments, storage service client 1010 may be configured to generate web services requests according to a Representational State Transfer (REST)-style web services architecture, a document- or message-based web services architecture, or another suitable web services architecture.

In some embodiments, storage service client 1010 may be configured to provide access to web services-based storage to other applications in a manner that is transparent to those applications. For example, storage service client 1010 may be configured to integrate with an operating system or file system to provide storage in accordance with a suitable variant of the storage model described herein. However, the operating system or file system may present a different storage interface to applications, such as a conventional file system hierarchy of files, directories and/or folders. In such an embodiment, applications may not need to be modified to make use of the storage system service model described herein. Instead, the details of interfacing to Web services platform 1030 may be coordinated by storage service client 1010 and the operating system or file system on behalf of applications executing within the operating system environment.

Storage service clients 1010 may convey web services requests to and receive responses from Web services platform 1030 via network 1020. In various embodiments, network 1020 may encompass any suitable combination of networking hardware and protocols necessary to establish web-based communications between clients 1010 and platform 1030. For example, network 1020 may generally encompass the various telecommunications networks and service providers that collectively implement the Internet. Network 1020 may also include private networks such as local area networks (LANs) or wide area networks (WANs) as well as public or private wireless networks. For example, both a given client 1010 and Web services platform 1030 may be respectively provisioned within enterprises having their own internal networks. In such an embodiment, network 1020 may include the hardware (e.g., modems, routers, switches, load balancers, proxy servers, etc.) and software (e.g., protocol stacks, accounting software, firewall/security software, etc.) necessary to establish a networking link between given client 1010 and the Internet as well as between the Internet and Web services platform 1030. It is noted that in some embodiments, storage service clients 1010 may communicate with Web services platform 1030 using a private network rather than the public Internet. For example, clients 1010 may be provisioned within the same enterprise as the database service (and/or the underlying system) described herein. In such a case, clients 1010 may communicate with platform 1030 entirely through a private network 1020 (e.g., a LAN or WAN that may use Internet-based communication protocols but which is not publicly accessible).

Generally speaking, Web services platform 1030 may be configured to implement one or more service endpoints configured to receive and process web services requests, such as requests to access tables maintained on behalf of clients/users by a database service, and/or the items and attributes stored in those tables. For example, Web services platform 1030 may include hardware and/or software configured to implement various service endpoints and to properly receive and process HTTP-based web services requests directed to those endpoints. In one embodiment, Web services platform 1030 may be implemented as a server system configured to receive web services requests from clients 1010 and to forward them to various components that collectively implement a database system for processing. In other embodiments, Web services platform 1030 may be configured as a number of distinct systems (e.g., in a cluster topology) implementing load balancing and other request management features configured to dynamically manage large-scale web services request processing loads.

As illustrated in FIG. 10, Web services platform 1030 may include a front end module 1040 (which may be configured to receive, authenticate, parse, throttle and/or dispatch service requests, among other things), one or more administrative components, or auto admin instances, 1050 (which may be configured to provide a variety of visibility and/or control functions, as described in more detail below), and a plurality of storage node instances (shown as 1060a-1060n), each of which may maintain and manage one or more tables on behalf of clients/users or on behalf of the database service (and its underlying system) itself. Some of the functionality provided by each of these types of components is described in more detail below, according to various embodiments.

In various embodiments, Web services platform 1030 may be configured to support different types of web services requests. For example, in some embodiments, platform 1030 may be configured to implement a particular web services application programming interface (API) that supports a variety of operations on tables that are maintained and managed on behalf of clients/users by the database service system (and/or data stored in those tables). Examples of the operations supported by such an API are described in more detail below.

In addition to functioning as an addressable endpoint for clients' web services requests, in some embodiments Web services platform 1030 may implement various client management features. For example, platform 1030 may coordinate the metering and accounting of client usage of web services, including storage resources, such as by tracking the identities of requesting clients 1010, the number and/or frequency of client requests, the size of tables and/or items stored or retrieved on behalf of clients 1010, overall storage bandwidth used by clients 1010, class of storage requested by clients 1010, and/or any other measurable client usage parameter. Platform 1030 may also implement financial accounting and billing systems, or may maintain a database of usage data that may be queried and processed by external systems for reporting and billing of client usage activity. In some embodiments, platform 1030 may include a lock manager and/or a bootstrap configuration (not shown).

In various embodiments, a database service may be implemented on one or more computing nodes that are configured to perform the functionality described herein. In some embodiments, the service may be implemented by a Web services platform (such as Web services platform 1030 in FIG. 10) that is made up of multiple computing nodes, each of which may perform one or more of the functions described herein. Various collections of the computing nodes may be configured to provide the functionality of an auto-admin cluster, a cluster of resources dedicated to the database service, and a collection of external resources (which may be shared with other Web services or applications, in some embodiments).

In some embodiments, the external resources with which the system interacts to provide the functionality described herein may include a simple workflow component, illustrated in FIG. 10 as simple workflow component 1070. Simple workflow component 1070 may provide a framework through which other components interact with the simple workflow system. In some embodiments, Web services platform 1030 may include an access API built on top of that framework (not shown). This interface may allow the system to implement APIs suitable for the usage patterns that are expected to be experienced by the database service. In some embodiments, components or modules of the system that use simple workflow component 1070 may include these interfaces rather than interfacing directly to the interfaces provided by simple workflow component 1070. In some embodiments, the Web services platform 1030 may rely on one or more external resources, such as an external storage service 1080, and/or other external (and in some cases shared) external resources, in addition to a simple workflow component 1070. In some embodiments, simple workflow component 1070 may be used to perform distributed operations, such as those that extend beyond a particular partition replication group.

Example Provider Network Environments

This section describes example provider network environments in which embodiments of the methods and apparatus described herein may be implemented. However, these example provider network environments are not intended to be limiting.

Figure 11:
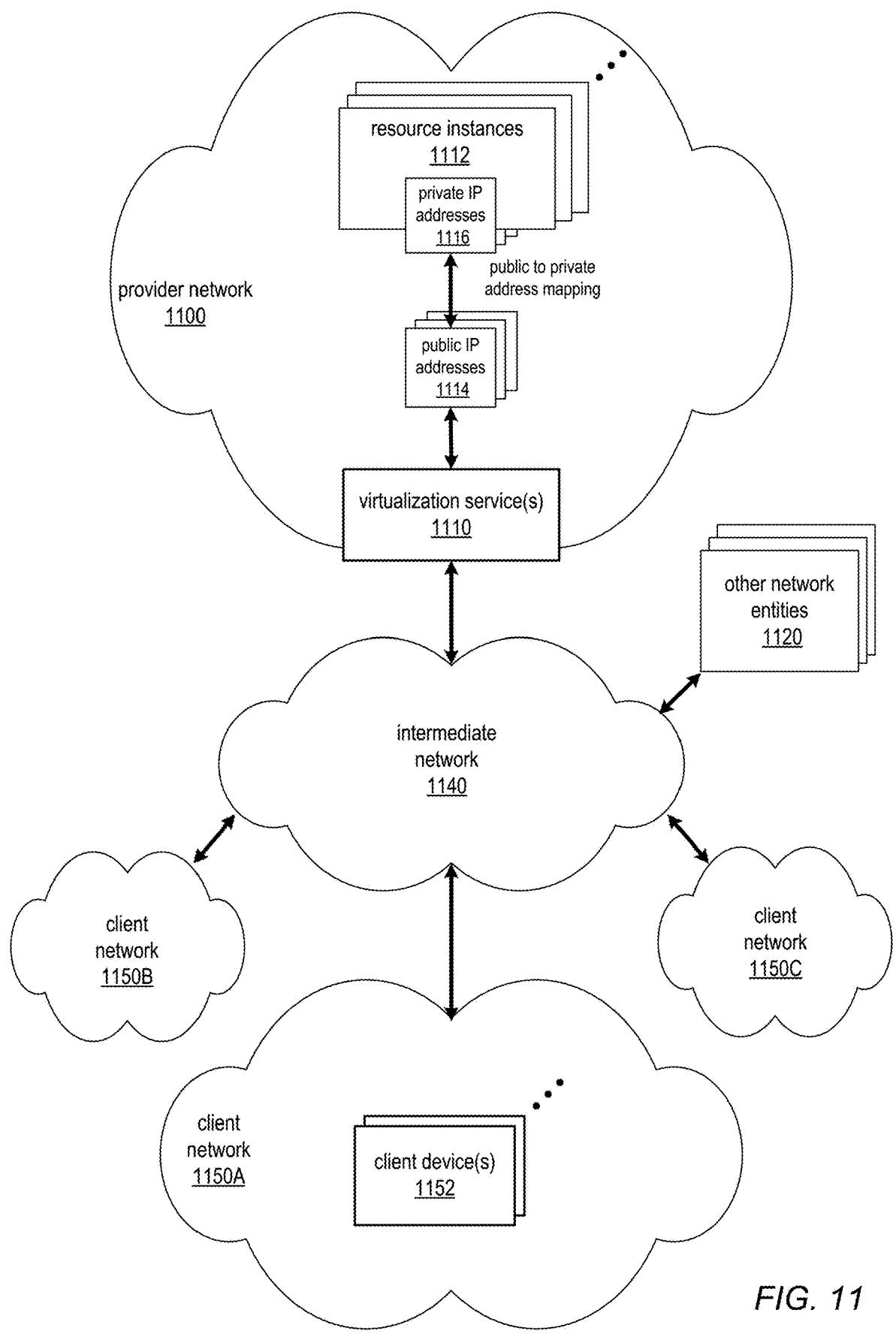
FIG. 11 illustrates an example provider network environment, according to at least some embodiments.

FIG. 11 illustrates an example provider network environment, according to at least some embodiments. A provider network 1100 may provide resource virtualization to clients via one or more virtualization services 1110 that allow clients to purchase, rent, or otherwise obtain instances 1112 of virtualized resources, including but not limited to computation and storage resources, implemented on devices within the provider network or networks in one or more data centers. Private IP addresses 1116 may be associated with the resource instances 1112; the private IP addresses are the internal network addresses of the resource instances 1112 on the provider network 1100. In some embodiments, the provider network 1100 may also provide public IP addresses 1114 and/or public IP address ranges (e.g., Internet Protocol version 4 (IPv4) or Internet Protocol version 6 (IPv6) addresses) that clients may obtain from the provider 1100.

Conventionally, the provider network 1100, via the virtualization services 1110, may allow a client of the service provider (e.g., a client that operates client network 1150A) to dynamically associate at least some public IP addresses 1114 assigned or allocated to the client with particular resource instances 1112 assigned to the client. The provider network 1100 may also allow the client to remap a public IP address 1114, previously mapped to one virtualized computing resource instance 1112 allocated to the client, to another virtualized computing resource instance 1112 that is also allocated to the client. Using the virtualized computing resource instances 1112 and public IP addresses 1114 provided by the service provider, a client of the service provider such as the operator of client network 1150A may, for example, implement client-specific applications and present the client's applications on an intermediate network 1140, such as the Internet. Other network entities 1120 on the intermediate network 1140 may then generate traffic to a destination public IP address 1114 published by the client network 1150A; the traffic is routed to the service provider data center, and at the data center is routed, via a network substrate, to the private IP address 1116 of the virtualized computing resource instance 1112 currently mapped to the destination public IP address 1114. Similarly, response traffic from the virtualized computing resource instance 1112 may be routed via the network substrate back onto the intermediate network 1140 to the source entity 1120.

Private IP addresses, as used herein, refer to the internal network addresses of resource instances in a provider network. Private IP addresses are only routable within the provider network. Network traffic originating outside the provider network is not directly routed to private IP addresses; instead, the traffic uses public IP addresses that are mapped to the resource instances. The provider network may include network devices or appliances that provide network address translation (NAT) or similar functionality to perform the mapping from public IP addresses to private IP addresses and vice versa.

Public IP addresses, as used herein, are Internet routable network addresses that are assigned to resource instances, either by the service provider or by the client. Traffic routed to a public IP address is translated, for example via 1:1 network address translation (NAT), and forwarded to the respective private IP address of a resource instance.

Some public IP addresses may be assigned by the provider network infrastructure to particular resource instances; these public IP addresses may be referred to as standard public IP addresses, or simply standard IP addresses. In at least some embodiments, the mapping of a standard IP address to a private IP address of a resource instance is the default launch configuration for all a resource instance types.

At least some public IP addresses may be allocated to or obtained by clients of the provider network 1100; a client may then assign their allocated public IP addresses to particular resource instances allocated to the client. These public IP addresses may be referred to as client public IP addresses, or simply client IP addresses. Instead of being assigned by the provider network 1100 to resource instances as in the case of standard IP addresses, client IP addresses may be assigned to resource instances by the clients, for example via an API provided by the service provider. Unlike standard IP addresses, client IP Addresses are allocated to client accounts and can be remapped to other resource instances by the respective clients as necessary or desired. A client IP address is associated with a client's account, not a particular resource instance, and the client controls that IP address until the client chooses to release it. Unlike conventional static IP addresses, client IP addresses allow the client to mask resource instance or availability zone failures by remapping the client's public IP addresses to any resource instance associated with the client's account. The client IP addresses, for example, enable a client to engineer around problems with the client's resource instances or software by remapping client IP addresses to replacement resource instances.

Figure 12:
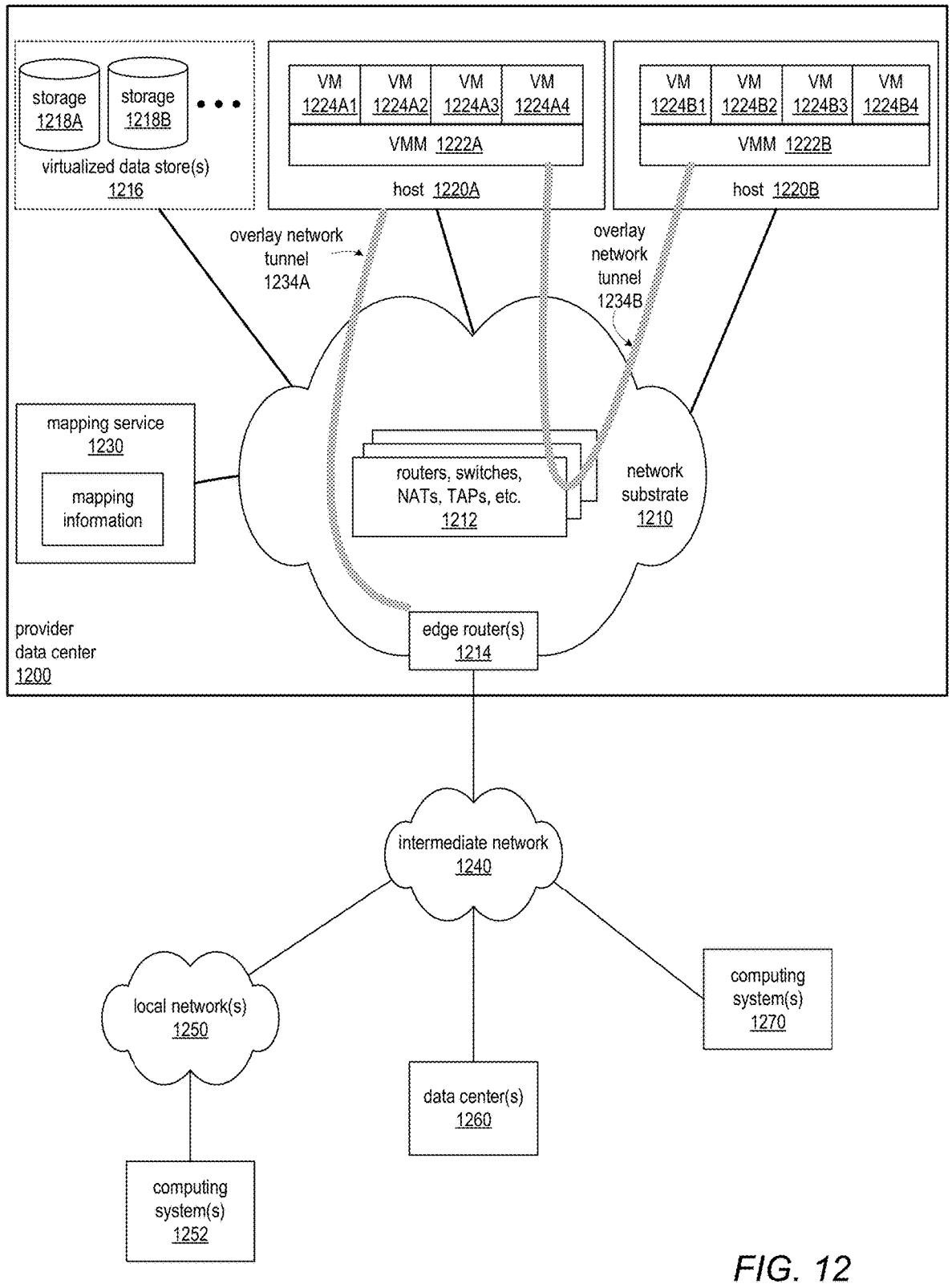
FIG. 12 illustrates an example data center that implements an overlay network on a network substrate using IP tunneling technology, according to some embodiments.

FIG. 12 illustrates an example data center that implements an overlay network on a network substrate using IP tunneling technology, according to at least some embodiments. A provider data center 1200 may include a network substrate that includes networking devices 1212 such as routers, switches, network address translators (NATs), and so on. At least some embodiments may employ an Internet Protocol (IP) tunneling technology to provide an overlay network via which encapsulated packets may be passed through network substrate 1210 using tunnels. The IP tunneling technology may provide a mapping and encapsulating system for creating an overlay network on a network (e.g., a local network in data center 1200 of FIG. 12) and may provide a separate namespace for the overlay layer (the public IP addresses) and the network substrate 1210 layer (the private IP addresses). Packets in the overlay layer may be checked against a mapping directory (e.g., provided by mapping service 1230) to determine what their tunnel substrate target (private IP address) should be. The IP tunneling technology provides a virtual network topology (the overlay network); the interfaces (e.g., service APIs) that are presented to clients are attached to the overlay network so that when a client provides an IP address to which the client wants to send packets, the IP address is run in virtual space by communicating with a mapping service (e.g., mapping service 1230) that knows where the IP overlay addresses are.

In at least some embodiments, the IP tunneling technology may map IP overlay addresses (public IP addresses) to substrate IP addresses (private IP addresses), encapsulate the packets in a tunnel between the two namespaces, and deliver the packet to the correct endpoint via the tunnel, where the encapsulation is stripped from the packet. In FIG. 12, an example overlay network tunnel 1234A from a virtual machine (VM) 1224A on host 1220A to a device on the intermediate network 1250 and an example overlay network tunnel 1234B between a VM 1224B on host 1220B and a VM 1224C on host 1220C are shown. In some embodiments, a packet may be encapsulated in an overlay network packet format before sending, and the overlay network packet may be stripped after receiving. In other embodiments, instead of encapsulating packets in overlay network packets, an overlay network address (public IP address) may be embedded in a substrate address (private IP address) of a packet before sending, and stripped from the packet address upon receiving. As an example, the overlay network may be implemented using 32-bit IPv4 (Internet Protocol version 4) addresses as the public IP addresses, and the IPv4 addresses may be embedded as part of 128-bit IPv6 (Internet Protocol version 6) addresses used on the substrate network as the private IP addresses.

Referring to FIG. 12, at least some networks in which embodiments may be implemented may include hardware virtualization technology that enables multiple operating systems to run concurrently on a host computer (e.g., hosts 1220A and 1220B of FIG. 12), i.e. as virtual machines (VMs) 1224 on the hosts 1220. The VMs 1224 may, for example, be rented or leased to clients of a network provider. A hypervisor, or virtual machine monitor (VMM) 1222, on a host 1220 presents the VMs 1224 on the host with a virtual platform and monitors the execution of the VMs 1224. Each VM 1224 may be provided with one or more private IP addresses; the VMM 1222 on a host 1220 may be aware of the private IP addresses of the VMs 1224 on the host. A mapping service 1230 may be aware of all network IP prefixes and the IP addresses of routers or other devices serving IP addresses on the local network. This includes the IP addresses of the VMMs 1222 serving multiple VMs 1224. The mapping service 1230 may be centralized, for example on a server system, or alternatively may be distributed among two or more server systems or other devices on the network. A network may, for example, use the mapping service technology and IP tunneling technology to, for example, route data packets between VMs 1224 on different hosts 1220 within the data center 1200 network; note that an interior gateway protocol (IGP) may be used to exchange routing information within such a local network.

In addition, a network such as the provider data center 1200 network (which is sometimes referred to as an autonomous system (AS)) may use the mapping service technology, IP tunneling technology, and routing service technology to route packets from the VMs 1224 to Internet destinations, and from Internet sources to the VMs 1224. Note that an external gateway protocol (EGP) or border gateway protocol (BGP) is typically used for Internet routing between sources and destinations on the Internet. FIG. 12 shows an example provider data center 1200 implementing a network that provides resource virtualization technology and that provides full Internet access via edge router(s) 1214 that connect to Internet transit providers, according to at least some embodiments. The provider data center 1200 may, for example, provide clients the ability to implement virtual computing systems (VMs 1224) via a hardware virtualization service and the ability to implement virtualized data stores 1216 on storage resources 1218 via a storage virtualization service.

The data center 1200 network may implement IP tunneling technology, mapping service technology, and a routing service technology to route traffic to and from virtualized resources, for example to route packets from the VMs 1224 on hosts 1220 in data center 1200 to Internet destinations, and from Internet sources to the VMs 1224. Internet sources and destinations may, for example, include computing systems 1270 connected to the intermediate network 1240 and computing systems 1252 connected to local networks 1250 that connect to the intermediate network 1240 (e.g., via edge router(s) 1214 that connect the network 1250 to Internet transit providers). The provider data center 1200 network may also route packets between resources in data center 1200, for example from a VM 1224 on a host 1220 in data center 1200 to other VMs 1224 on the same host or on other hosts 1220 in data center 1200.

A service provider that provides data center 1200 may also provide additional data center(s) 1260 that include hardware virtualization technology similar to data center 1200 and that may also be connected to intermediate network 1240. Packets may be forwarded from data center 1200 to other data centers 1260, for example from a VM 1224 on a host 1220 in data center 1200 to another VM on another host in another, similar data center 1260, and vice versa.

While the above describes hardware virtualization technology that enables multiple operating systems to run concurrently on host computers as virtual machines (VMs) on the hosts, where the VMs may be rented or leased to clients of the network provider, the hardware virtualization technology may also be used to provide other computing resources, for example storage resources 1218, as virtualized resources to clients of a network provider in a similar manner.

Figure 13:
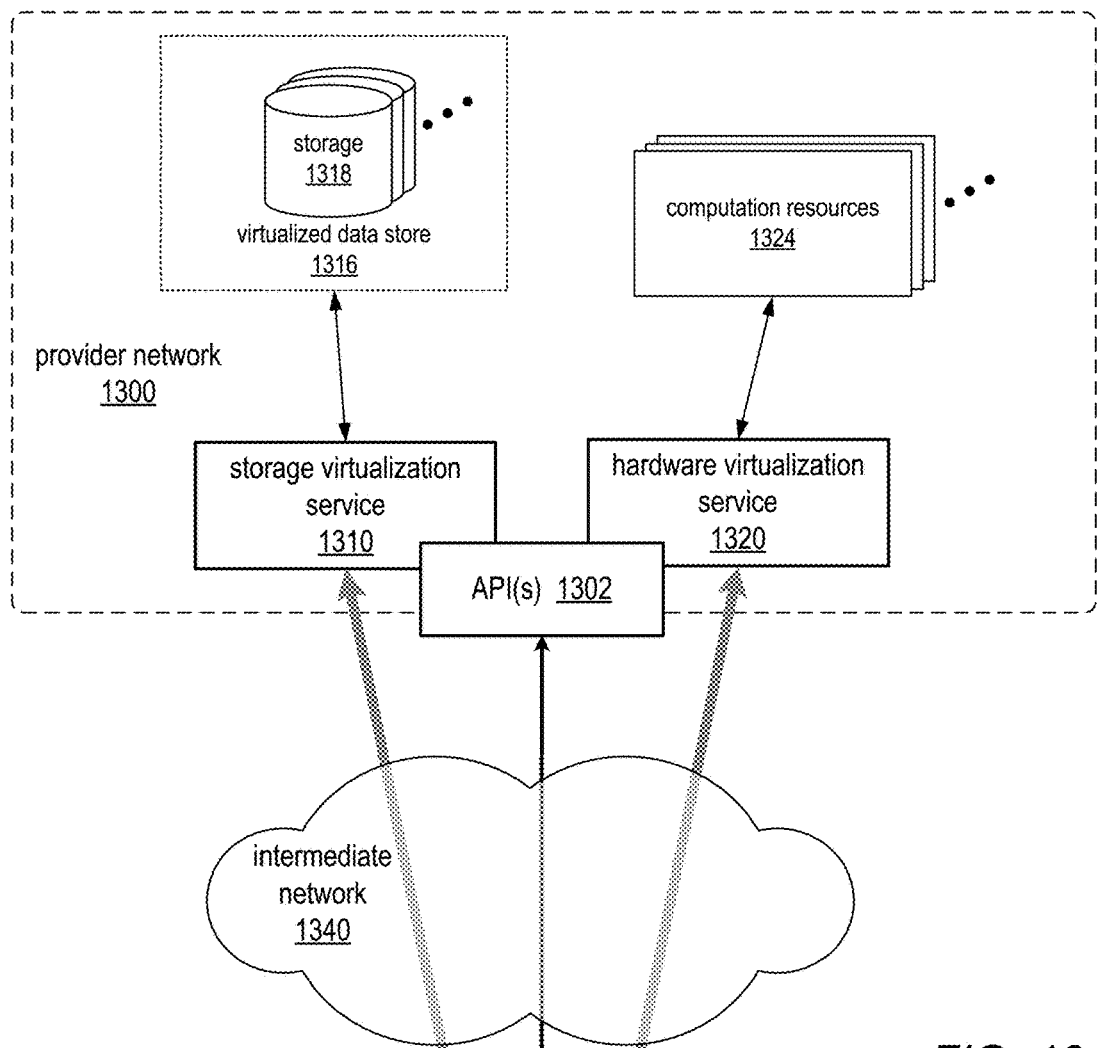
FIG. 13 is a block diagram of an example provider network that provides a storage virtualization service and a hardware virtualization service to clients, according to at least some embodiments.
Figure 13:
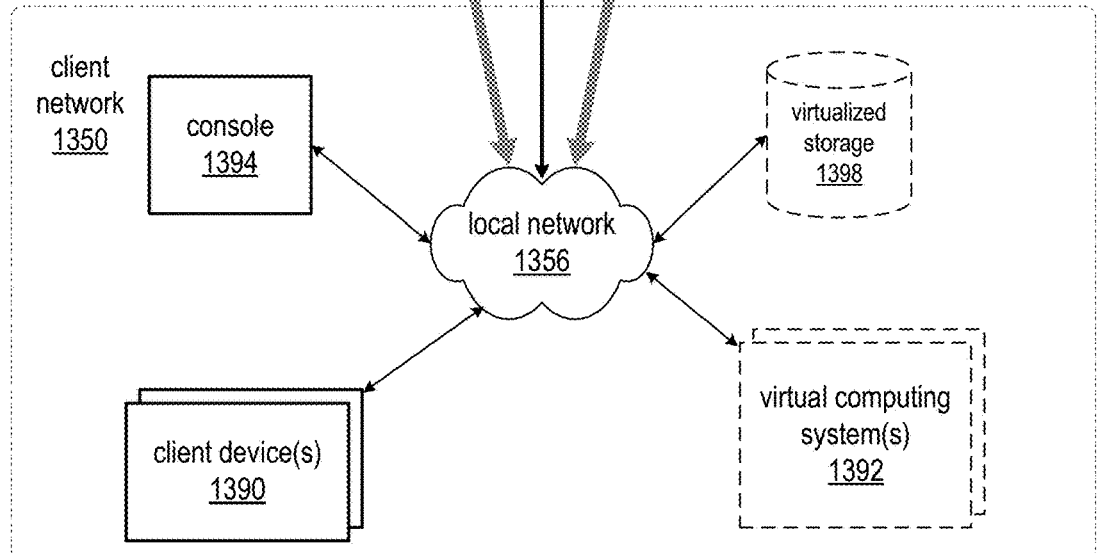

FIG. 13 is a block diagram of an example provider network that provides a storage virtualization service and a hardware virtualization service to clients, according to at least some embodiments. Hardware virtualization service 1320 provides multiple computation resources 1324 (e.g., VMs) to clients. The computation resources 1324 may, for example, be rented or leased to clients of the provider network 1300 (e.g., to a client that implements client network 1350). Each computation resource 1324 may be provided with one or more private IP addresses. Provider network 1300 may be configured to route packets from the private IP addresses of the computation resources 1324 to public Internet destinations, and from public Internet sources to the computation resources 1324.

Provider network 1300 may provide a client network 1350, for example coupled to intermediate network 1340 via local network 1356, the ability to implement virtual computing systems 1392 via hardware virtualization service 1320 coupled to intermediate network 1340 and to provider network 1300. In some embodiments, hardware virtualization service 1320 may provide one or more APIs 1302, for example a web services interface, via which a client network 1350 may access functionality provided by the hardware virtualization service 1320, for example via a console 1394. In at least some embodiments, at the provider network 1300, each virtual computing system 1392 at client network 1350 may correspond to a computation resource 1324 that is leased, rented, or otherwise provided to client network 1350.

From an instance of a virtual computing system 1392 and/or another client device 1390 or console 1394, the client may access the functionality of storage virtualization service 1310, for example via one or more APIs 1302, to access data from and store data to a virtualized data store 1316 provided by the provider network 1300. In some embodiments, a virtualized data store gateway (not shown) may be provided at the client network 1350 that may locally cache at least some data, for example frequently accessed or critical data, and that may communicate with virtualized data store service 1310 via one or more communications channels to upload new or modified data from a local cache so that the primary store of data (virtualized data store 1316) is maintained. In at least some embodiments, a user, via a virtual computing system 1392 and/or on another client device 1390, may mount and access virtualized data store 1316 volumes, which appear to the user as local virtualized storage 1398.

While not shown in FIG. 13, the virtualization service(s) may also be accessed from resource instances within the provider network 1300 via API(s) 1302. For example, a client, appliance service provider, or other entity may access a virtualization service from within a respective private network on the provider network 1300 via an API 1302 to request allocation of one or more resource instances within the private network or within another private network.

FIG. 14 illustrates an example provider network that provides private networks on the provider network to at least some clients, according to at least some embodiments. A client's virtualized private network 1460 on a provider network 1400, for example, enables a client to connect their existing infrastructure (e.g., devices 1452) on client network 1450 to a set of logically isolated resource instances (e.g., VMs 1424A and 1424B and storage 1418A and 1418B), and to extend management capabilities such as security services, firewalls, and intrusion detection systems to include their resource instances.

A client's virtualized private network 1460 may be connected to a client network 1450 via a private communications channel 1442. A private communications channel 1442 may, for example, be a tunnel implemented according to a network tunneling technology or some other peering connection over an intermediate network 1440. The intermediate network may, for example, be a shared network or a public network such as the Internet. Alternatively, a private communications channel 1442 may be implemented over a direct, dedicated connection between virtualized private network 1460 and client network 1450.

A public network may be broadly defined as a network that provides open access to and interconnectivity among a plurality of entities. The Internet, or World Wide Web (WWW) is an example of a public network. A shared network may be broadly defined as a network to which access is limited to two or more entities, in contrast to a public network to which access is not generally limited. A shared network may, for example, include one or more local area networks (LANs) and/or data center networks, or two or more LANs or data center networks that are interconnected to form a wide area network (WAN). Examples of shared networks may include, but are not limited to, corporate networks and other enterprise networks. A shared network may be anywhere in scope from a network that covers a local area to a global network. Note that a shared network may share at least some network infrastructure with a public network, and that a shared network may be coupled to one or more other networks, which may include a public network, with controlled access between the other network(s) and the shared network. A shared network may also be viewed as a private network, in contrast to a public network such as the Internet. In embodiments, either a shared network or a public network may serve as an intermediate network between a provider network and a client network.

To establish a virtualized private network 1460 for a client on provider network 1400, one or more resource instances (e.g., VMs 1424A and 1424B and storage 1418A and 1418B) may be allocated to the virtualized private network 1460. Note that other resource instances (e.g., storage 1418C and VMs 1424C) may remain available on the provider network 1400 for other client usage. A range of public IP addresses may also be allocated to the virtualized private network 1460. In addition, one or more networking devices (routers, switches, etc.) of the provider network 1400 may be allocated to the virtualized private network 1460. A private communications channel 1442 may be established between a private gateway 1462 at virtualized private network 1460 and a gateway 1456 at client network 1450.

In at least some embodiments, in addition to, or instead of, a private gateway 1462, virtualized private network 1460 may include a public gateway 1464 that enables resources within virtualized private network 1460 to communicate directly with entities (e.g., network entity 1444) via intermediate network 1440, and vice versa, instead of or in addition to via private communications channel 1442.

Virtualized private network 1460 may be, but is not necessarily, subdivided into two or more subnets 1470. For example, in implementations that include both a private gateway 1462 and a public gateway 1464, the private network may be subdivided into a subnet 1470A that includes resources (VMs 1424A and storage 1418A, in this example) reachable through private gateway 1462, and a subnet 1470B that includes resources (VMs 1424B and storage 1418B, in this example) reachable through public gateway 1464.

The client may assign particular client public IP addresses to particular resource instances in virtualized private network 1460. A network entity 1444 on intermediate network 1440 may then send traffic to a public IP address published by the client; the traffic is routed, by the provider network 1400, to the associated resource instance. Return traffic from the resource instance is routed, by the provider network 1400, back to the network entity 1444 over intermediate network 1440. Note that routing traffic between a resource instance and a network entity 1444 may require network address translation to translate between the public IP address and the private IP address of the resource instance.

At least some embodiments may allow a client to remap public IP addresses in a client's virtualized private network 1460 as illustrated in FIG. 14 to devices on the client's external network 1450. When a packet is received (e.g., from network entity 1444), the network 1400 may determine that the destination IP address indicated by the packet has been remapped to an endpoint on external network 1450 and handle routing of the packet to the respective endpoint, either via private communications channel 1442 or via the intermediate network 1440. Response traffic may be routed from the endpoint to the network entity 1444 through the provider network 1400, or alternatively may be directly routed to the network entity 1444 by the client network 1450. From the perspective of the network entity 1444, it appears as if the network entity 1444 is communicating with the public IP address of the client on the provider network 1400. However, the network entity 1444 has actually communicated with the endpoint on client network 1450.

While FIG. 14 shows network entity 1444 on intermediate network 1440 and external to provider network 1400, a network entity may be an entity on provider network 1400. For example, one of the resource instances provided by provider network 1400 may be a network entity that sends traffic to a public IP address published by the client.

Illustrative System

Figure 15:
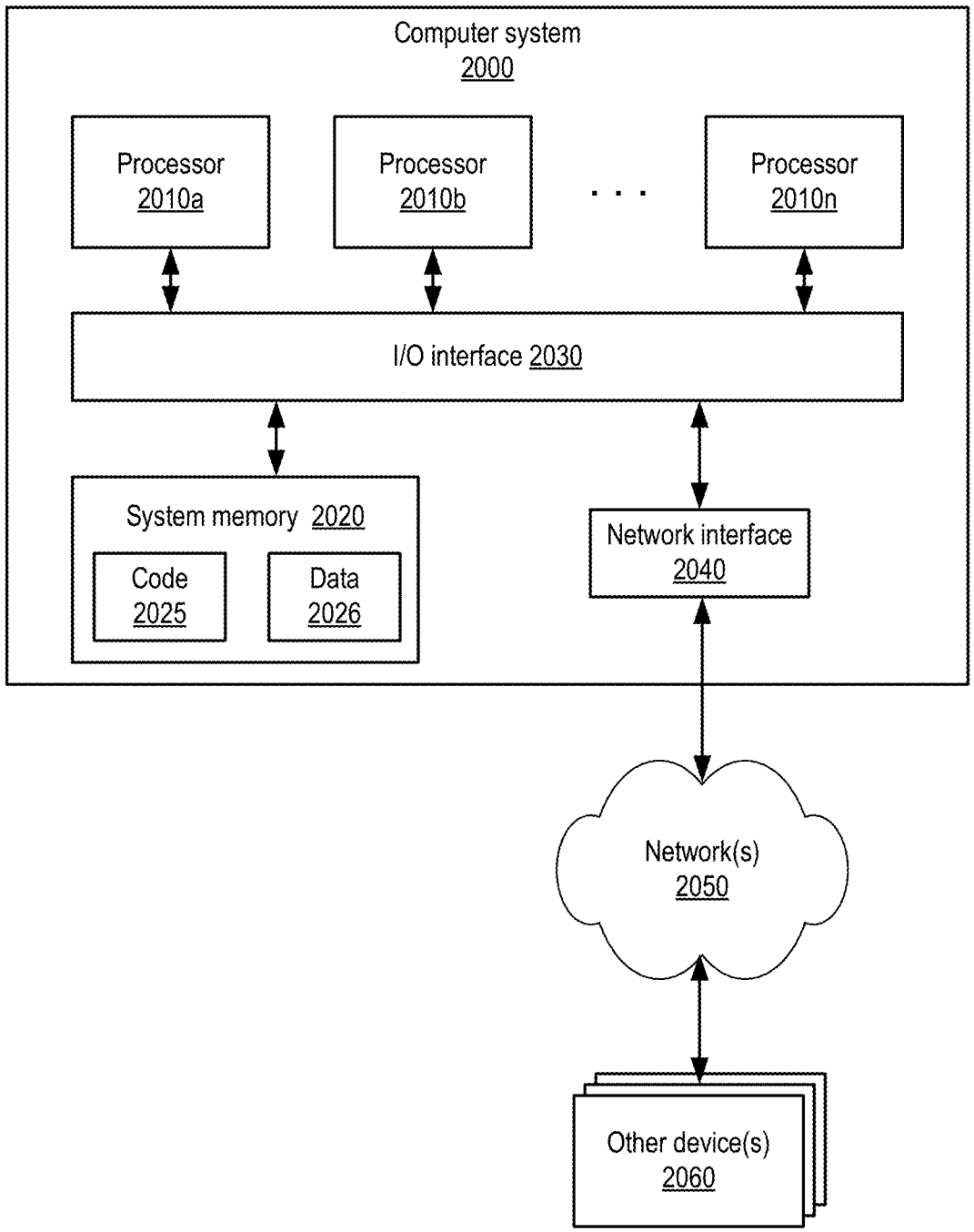
FIG. 15 is a block diagram illustrating an example computer system that may be used in some embodiments.

In at least some embodiments, a server that implements a portion or all of the methods and apparatus described herein may include a general-purpose computer system that includes or is configured to access one or more computer-accessible media, such as computer system 2000 illustrated in FIG. 15. In the illustrated embodiment, computer system 2000 includes one or more processors 2010 coupled to a system memory 2020 via an input/output (I/O) interface 2030. Computer system 2000 further includes a network interface 2040 coupled to I/O interface 2030.

In various embodiments, computer system 2000 may be a uniprocessor system including one processor 2010, or a multiprocessor system including several processors 2010 (e.g., two, four, eight, or another suitable number). Processors 2010 may be any suitable processors capable of executing instructions. For example, in various embodiments, processors 2010 may be general-purpose or embedded processors implementing any of a variety of instruction set architectures (ISAs), such as the x86, PowerPC, SPARC, or MIPS ISAs, or any other suitable ISA. In multiprocessor systems, each of processors 2010 may commonly, but not necessarily, implement the same ISA.

System memory 2020 may be configured to store instructions and data accessible by processor(s) 2010. In various embodiments, system memory 2020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques, and data described above for the methods and apparatus described herein, are shown stored within system memory 2020 as code 2025 and data 2026.

In one embodiment, I/O interface 2030 may be configured to coordinate I/O traffic between processor 2010, system memory 2020, and any peripheral devices in the device, including network interface 2040 or other peripheral interfaces. In some embodiments, I/O interface 2030 may perform any necessary protocol, timing or other data transformations to convert data signals from one component (e.g., system memory 2020) into a format suitable for use by another component (e.g., processor 2010). In some embodiments, I/O interface 2030 may include support for devices attached through various types of peripheral buses, such as a variant of the Peripheral Component Interconnect (PCI) bus standard or the Universal Serial Bus (USB) standard, for example. In some embodiments, the function of I/O interface 2030 may be split into two or more separate components, such as a north bridge and a south bridge, for example. Also, in some embodiments some or all of the functionality of I/O interface 2030, such as an interface to system memory 2020, may be incorporated directly into processor 2010.

Network interface 2040 may be configured to allow data to be exchanged between computer system 2000 and other devices 2060 attached to a network or networks 2050, such as other computer systems or devices as illustrated in FIGS. 1 through 14, for example. In various embodiments, network interface 2040 may support communication via any suitable wired or wireless general data networks, such as types of Ethernet network, for example. Additionally, network interface 2040 may support communication via telecommunications/telephony networks such as analog voice networks or digital fiber communications networks, via storage area networks such as Fibre Channel SANs, or via any other suitable type of network and/or protocol.

In some embodiments, system memory 2020 may be one embodiment of a computer-accessible medium configured to store program instructions and data as described above for FIGS. 1 through 14 for implementing embodiments of methods and apparatus as described herein. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computer system 2000 via I/O interface 2030. A non-transitory computer-accessible storage medium may also include any volatile or non-volatile media such as RAM (e.g. SDRAM, DDR SDRAM, RDRAM, SRAM, etc.), ROM, etc, that may be included in some embodiments of computer system 2000 as system memory 2020 or another type of memory. Further, a computer-accessible medium may include transmission media or signals such as electrical, electromagnetic, or digital signals, conveyed via a communication medium such as a network and/or a wireless link, such as may be implemented via network interface 2040.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g.

SDRAM, DDR, RDRAM, SRAM, etc.), ROM, etc, as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A distributed computing system, comprising:
one or more hardware compute nodes configured to process a data set of data objects, wherein the data objects are stored using a first hardware computer system and a second hardware computer system that are accessible over one or more networks, wherein the processing of the data set includes generating a request to modify at least one of the data objects stored using the first and second hardware computer systems;
the first hardware computer system, configured to implement a distributed computing file system (DCFS) using an unstructured object storage service, wherein the DCFS stores the data objects of the data set as files using the unstructured object storage service, wherein the unstructured object storage service implements a first client-facing interface accessible to a plurality of clients, and wherein the unstructured data storage service is not guaranteed to return a latest version of the data objects produced by the request via the first client-facing interface;
the second hardware computer system, configured to implement a DCFS directory for the DCFS using a multi-tenant database service, wherein the DCFS directory stores metadata for the data objects of the DCFS, wherein the multi-tenant database service implements a second client-facing interface accessible to the plurality of clients, and wherein the multi-tenant database service is guaranteed to return a latest version of the metadata of the data objects produced by the request via the second client-facing interface;
wherein the DCFS directory is an authoritative store and source for directory information of the DCFS during processing of the data set by the one or more hardware compute nodes.

2. The distributed computing system as recited in claim 1, wherein, to process the data set, at least one of the one or more hardware compute nodes is configured to access the DCFS directory via the second client-facing interface of the multi-tenant database service to obtain strongly consistent metadata for accessing the data objects stored in the DCFS according to the first client-facing interface of the unstructured object storage service.

3. The distributed computing system as recited in claim 2, wherein at least one of the one or more hardware compute nodes is further configured to access the DCFS directory to store or update the metadata for accessing the data objects stored in the DCFS.

4. The distributed computing system as recited in claim 1, wherein the one or more hardware compute nodes are provisioned as resource instances in a client's private network on a provider network.

5. The distributed computing system as recited in claim 1, wherein one or both of the DCFS and the DCFS directory are implemented in a provider network, and wherein the one or more hardware compute nodes are implemented in a client network external to the provider network.

6. The distributed computing system as recited in claim 1, wherein the distributed computing system is implemented according to a distributed computing framework that enables the distributed processing of the data set across a cluster of compute nodes using a programming model of the distributed computing framework.

7. A method, comprising:
establishing a distributed computing file system (DCFS) on one or more storage devices to store data objects in an unstructured object storage service, wherein the unstructured object storage service is implemented on a first hardware computer system accessible over one or more networks and implements a first client-facing interface accessible to a plurality of clients;
establishing a DCFS directory to store metadata for the data objects in the DCFS in a multi-tenant database service different from the unstructured object storage service, wherein the multi-tenant database service is implemented on a second hardware computer system accessible over the one or more networks and implements a second client-facing interface accessible to the plurality of clients;
responsive to a request to modify a data object of the data objects, modifying the data object in the unstructured object storage service and metadata of the data object in the multi-tenant database service, wherein the unstructured data storage service is not guaranteed to return a latest version of the data object produced by the request via the first client-facing interface, and the multi-tenant database service is guaranteed to return a latest version of the metadata of the data object produced by the request via the second client-facing interface; and
accessing, by one or more compute nodes distinct from the first and second hardware computer systems, the DCFS directory to obtain the metadata for accessing the data objects stored in the DCFS.

8. The method as recited in claim 7, wherein the unstructured object storage service is eventually consistent, and wherein the metadata stored in the DCFS directory and accessed by the one or more compute nodes is strongly consistent.

9. The method as recited in claim 7, wherein the DCFS directory is an authoritative store and source for directory information of the DCFS during processing of the data objects stored in the DCFS by the one or more compute nodes.

10. The method as recited in claim 7, further comprising accessing the unstructured object storage service to retrieve respective data objects stored in the DCFS according to the metadata obtained from the DCFS directory.

11. The method as recited in claim 7, further comprising accessing the DCFS directory to update the metadata for accessing the data objects stored in the DCFS.

12. The method as recited in claim 7, further comprising:
storing, by at least one of the one or more compute nodes, one or more data objects to a cache;

checking, by at least one of the one or more compute nodes, the cache for required data objects;

if a required data object is in the cache, retrieving the data object from the cache; and if the required data object is not in the cache, accessing the DCFS directory to obtain metadata for retrieving the data object from the DCFS.

13. The method as recited in claim 7, further comprising:

periodically checking the metadata stored in the DCFS directory against metadata of the DCFS to detect inconsistencies between the DCFS directory and the DCFS; and upon detecting an inconsistency, resolving the inconsistency to correct the DCFS directory or the DCFS.

14. The method as recited in claim 7, further comprising at least one of the one or more compute nodes locally storing at least a portion of the DCFS directory.

15. The method as recited in claim 7, further comprising:

receiving a request to rename one or more data objects in the DCFS; and in response to the request, modifying metadata corresponding to the one or more data objects in the DCFS directory to reflect new names for the one or more data objects.

16. The method as recited in claim 15, wherein said modifying metadata corresponding to the one or more data objects in the DCFS directory to reflect new names for the one or more data objects maintains strong consistency for the metadata in the DCFS directory.

17. The method as recited in claim 15, further comprising, subsequent to said modifying metadata corresponding to the one or more data objects in the DCFS directory to reflect new names for the one or more data objects, performing one or more object storage service operations to obtain eventual consistency of the renamed one or more data objects in the DCFS.

18. The method as recited in claim 7, wherein the database service maintains the DCFS directory as a key-value store or as a relational database.

19. The method as recited in claim 7, wherein keys in the DCFS directory are generated according to a hash technique applied to path information of the data objects in the DCFS, and wherein values in the DCFS directory store the metadata for accessing the data objects stored in the DCFS.

20. The method as recited in claim 19, wherein the hash technique is an MD5 hash technique.

21. A non-transitory computer-accessible storage medium storing program instructions computer-executable to implement:

establishing a distributed computing file system (DCFS) to store data objects via one or more application program interface calls to an eventually consistent unstructured object storage service, wherein the unstructured object storage service is implemented on a first hardware computer system accessible over one or more networks and implements a first client-facing interface accessible to a plurality of clients;

establishing a DCFS directory to store metadata for the data objects in a multi-tenant database service different from the unstructured object storage service, wherein the multi-tenant database service is implemented on a second hardware computer system accessible over the one or more networks and implements a second client-facing interface accessible to the plurality of clients;

responsive to a request to modify a data object of the data objects, modifying the data object in the unstructured object storage service and metadata of the data object in the multi-tenant database service, wherein the unstructured data storage service is not guaranteed to return a latest version of the data object produced by the request via the first client-facing interface, and the multi-tenant database service is guaranteed to return a latest version of the metadata of the data object produced by the request via the second client-facing interface; and accessing the DCFS directory to obtain consistent metadata for accessing the data objects stored in the DCFS.

22. The non-transitory computer-accessible storage medium as recited in claim 21, wherein the program instructions are further computer-executable to implement accessing the unstructured object storage service to retrieve respective data objects stored in the DCFS according to the metadata obtained from the DCFS directory.

23. The non-transitory computer-accessible storage medium as recited in claim 21, wherein the program instructions are further computer-executable to implement accessing the DCFS directory to update the consistent metadata for accessing the data objects stored in the DCFS.

24. The non-transitory computer-accessible storage medium as recited in claim 21, wherein the DCFS directory is a key-value store, wherein keys in the DCFS directory are generated according to a hash technique applied to path information of the data objects in the DCFS, and wherein values in the DCFS directory store the consistent metadata for accessing the data objects stored in the DCFS.

* * * * *